United States Patent [19]
Fischer

[11] Patent Number: 5,390,247
[45] Date of Patent: Feb. 14, 1995

[54] METHOD AND APPARATUS FOR CREATING, SUPPORTING, AND USING TRAVELLING PROGRAMS

[76] Inventor: Addison M. Fischer, 60 14th Ave. South, Naples, Fla. 33942

[21] Appl. No.: 123,676

[22] Filed: Sep. 20, 1993

Related U.S. Application Data

[63] Continuation of Ser. No. 863,552, Apr. 6, 1992, abandoned.

[51] Int. Cl.6 .............................................. H04L 9/00
[52] U.S. Cl. ........................................ 380/25; 380/30
[58] Field of Search ................... 380/23, 25, 4, 49, 30; 395/200

[56] References Cited

U.S. PATENT DOCUMENTS

| | | | |
|---|---|---|---|
| 4,868,877 | 1/1989 | Fischer | 380/25 |
| 5,005,200 | 4/1991 | Fischer | 380/25 |
| 5,040,142 | 8/1991 | Mori et al. | |
| 5,142,578 | 8/1992 | Matyes et al. | 380/30 |
| 5,164,988 | 11/1992 | Matyes et al. | 380/25 |
| 5,214,702 | 5/1993 | Fischer | 380/25 |
| 5,261,002 | 11/1993 | Perlman et al. | 380/25 |
| 5,337,366 | 8/1994 | Fischer | 380/25 |

OTHER PUBLICATIONS

Office Automation Concepts and Tools, 1985, Springer-Verlag, Berlin, DE pp. 113-133, J. Hogg, "Intelligent Message Systems".

The Computer Journal, vol. 33, No. 4, Aug. 1990, Cambridge, GB, pp. 290-295, C. Mitchell et al., "A Secure Messaging Architecture Implementing The X.400-1988 Security Features".

*Primary Examiner*—Salvatore Cangialosi
*Attorney, Agent, or Firm*—Nixon & Vanderhye

[57] ABSTRACT

A method and apparatus for creating, supporting and using a "travelling program" is disclosed. A "travelling program" is a digital data structure which includes a sequence of instructions and associated data and which has the capability of determining at least one next destination or recipient for receiving the travelling program and for transmitting itself together with all relevant data determined by the program to the next recipient or destination. The travelling program can compute, according to any algorithm, the digital material which is to be signed, and also, as needed, the digital material which is to be verified. The program can conditionally decide, based on any known criteria, which users should participate in the signature process. Digital signatures allow the travelling program to provide other types of valuable authentication. The travelling program operates to automate data collection among a group of users. It can be sent to one user, attach (or detach) relevant data files and move on to the next user. Data or files, collected from one or more users can be deposited with another user, or accumulated for batched processing as desired. This methodology eliminates the need for individual users to be counted on to transmit all the required data in the required format. The present invention also efficiently performs electronic data interchange (EDI) in the context of a travelling program which sends itself from user to to the next within an organization, collecting, editing and approving data.

29 Claims, 29 Drawing Sheets

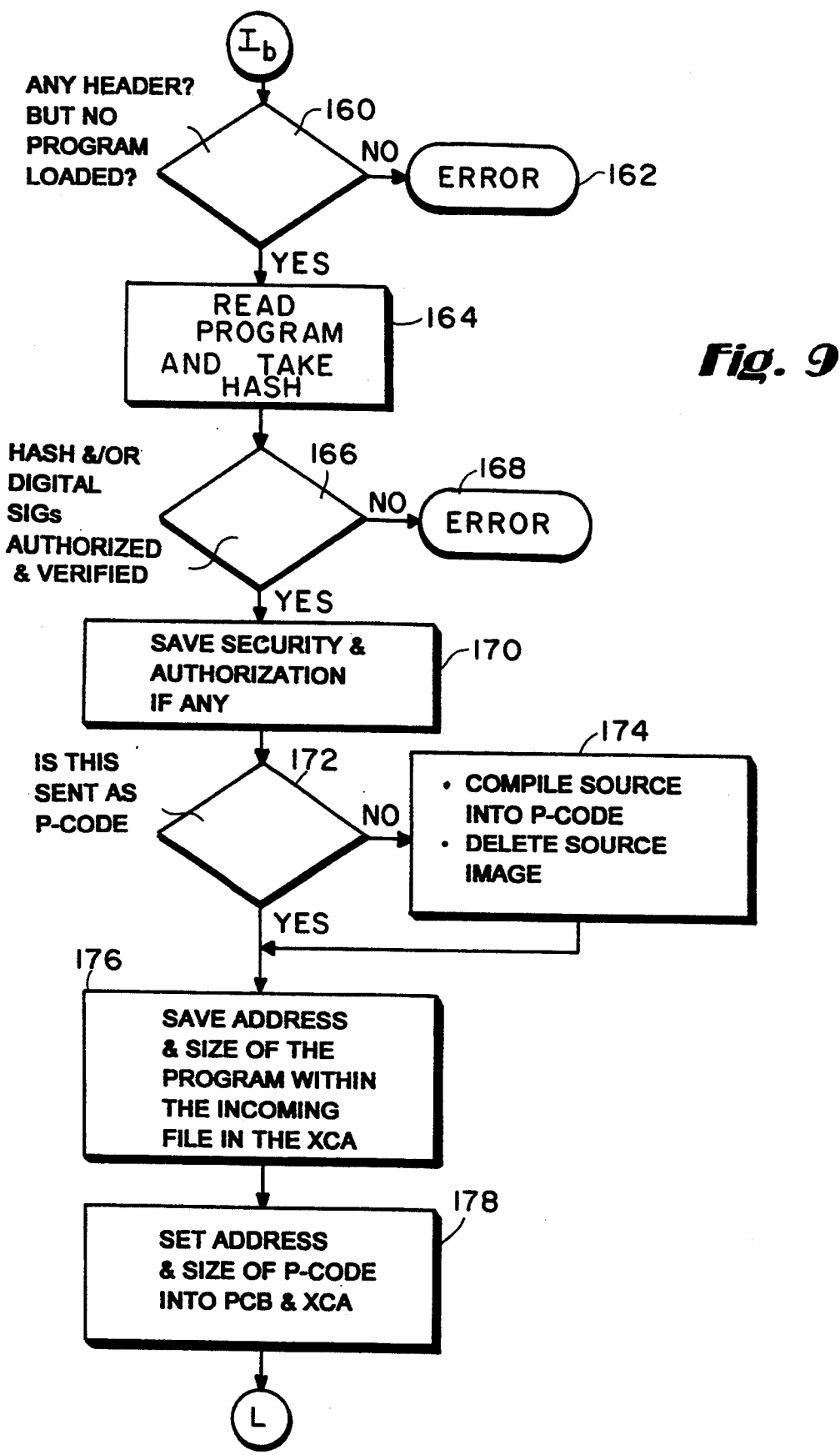

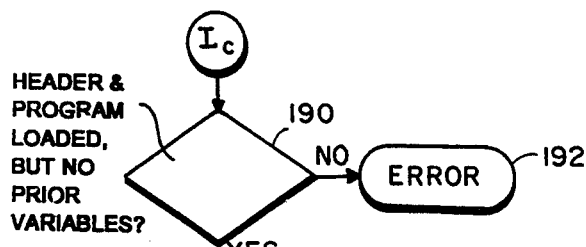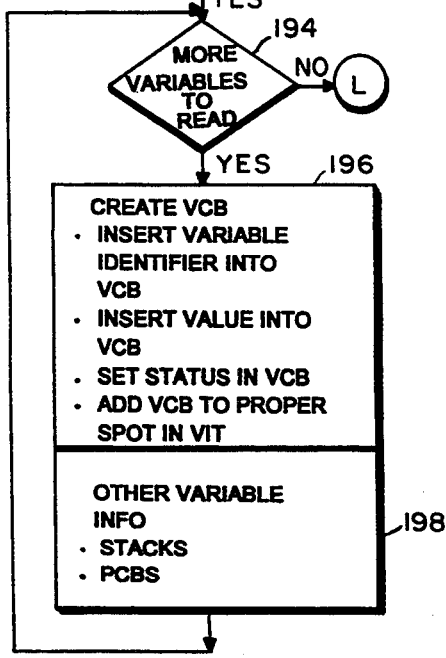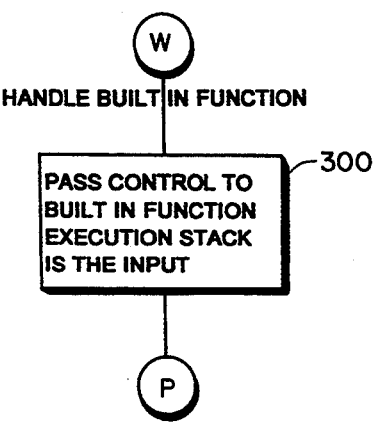

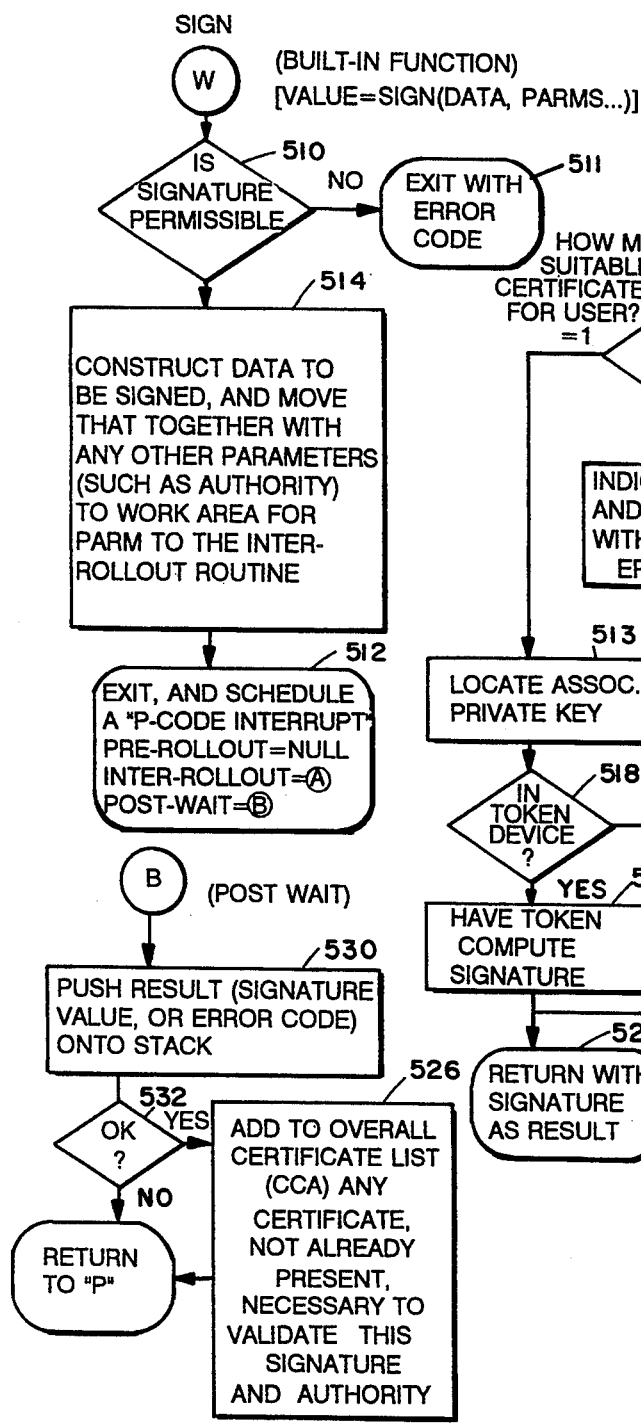
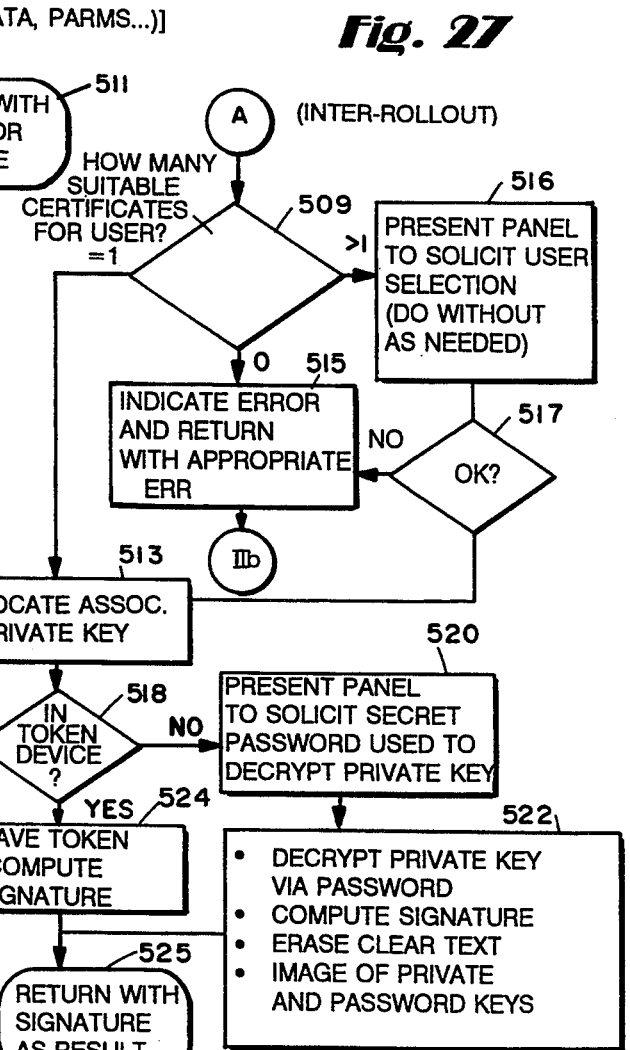
Fig. 26
Fig. 27

TIME DELAY(TIME)

SELECT FROM DIRECTORY
(OF FILES, USERS, ETC.)

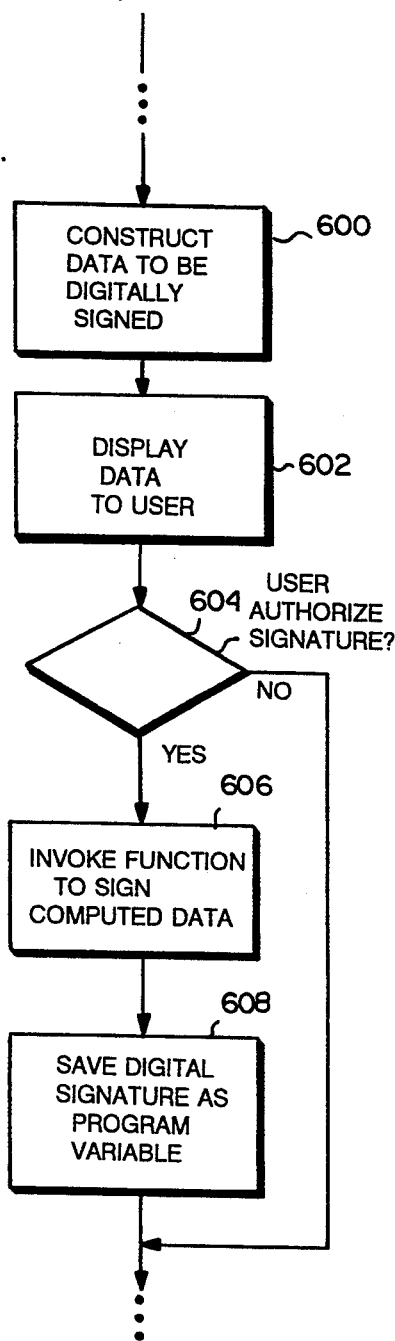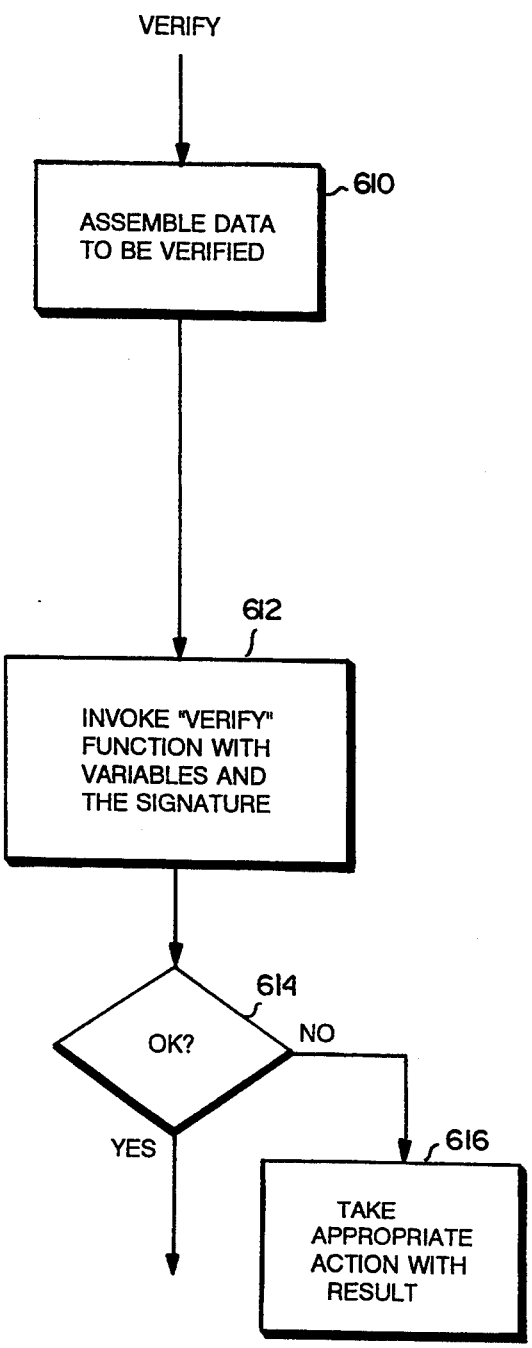

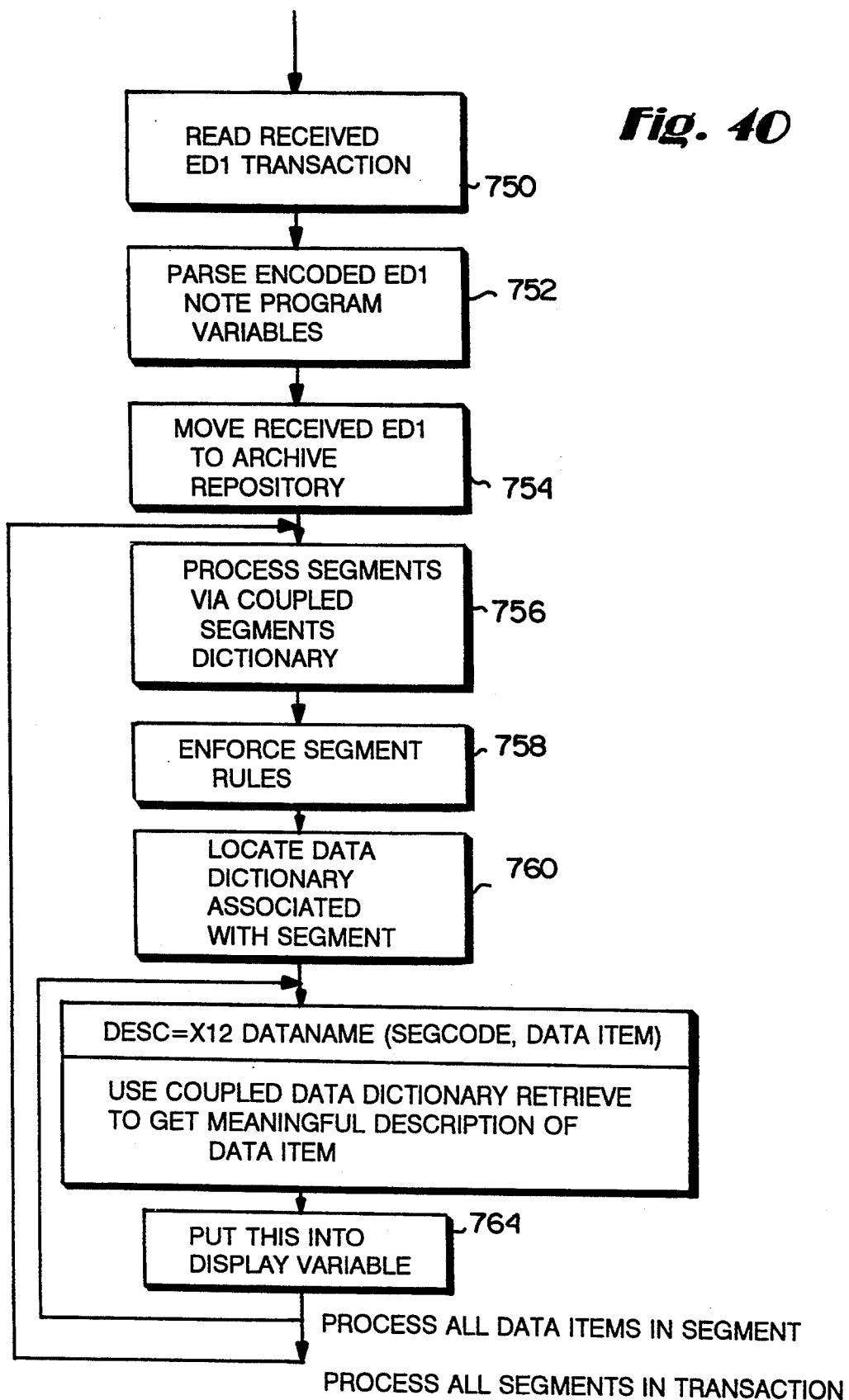

METHOD AND APPARATUS FOR CREATING, SUPPORTING, AND USING TRAVELLING PROGRAMS

This is a continuation of U.S. patent application Ser. No. 07/863,552, filed Apr. 6, 1992, now abandoned.

FIELD OF THE INVENTION

The present invention relates to a method and apparatus for creating a "travelling" program which has the capability of moving itself together with necessary associated data from one computer user to another to thereby create a powerful tool for processing, authenticating, and collecting data at various computer nodes.

BACKGROUND AND SUMMARY OF THE INVENTION

Within an organization, documents are often moved manually. A mail or delivery service is often employed when documents are required to be transmitted between organizations.

Techniques for electronically transmitting documents within an organization and between organizations are well known. The rapid growth of electronic mail systems, electronic transfer systems and the like have served to automate certain business transactions and eliminate some of the manual document transfers that are in most instances unnecessary.

One prior art methodology for automatically transferring information between users (for example, within an organization) utilizes a so-called "electronic forms" methodology. This "electronic form" methodology presents data to a user, solicits the user's input via a conventional display, verifies that the input data has been correctly entered, and thereafter transmits such data to another user.

The electronic form methodology is very limited in many respects. For example, if the data represents any value, then there is always the potential danger that data could be manipulated or altered, or simply created bogusly. Attempts to address this danger have involved flagging certain critical fields which are to be digitally signed. This allows a certain limited amount of authentication for specific input fields, exactly as they were entered.

However, it does not permit complex data structures to be assembled and then digitally signed. The present invention allows for the travelling program to compute, according to any algorithm whatsoever, the digital material which is to be signed, and also, as needed, the digital material which is to be verified.

Thus, for example, the present invention allows the actual data which is signed to be different than any field data itself. In fact, it is possible that the signed material contains none of the actual data as presented by the user.

An example, of one way this is especially useful is when the travelling program of the present invention creates an EDI (electronic data interchange) transaction based on aspects of the entered data. The program has the ability to sign the EDI transaction. Such EDI transactions may well be composed of complex digital information which was looked-up, based on internal tables within the program, from other tabular files, or from the supervisor or interpreter which drives the travelling program. Thus, input fields which may have been simply entered as "X"s which selected from some table, the actual digital material which is signed is entirely different.

It is anticipated that the type of digital signature described above may be applied to data construction which will have a long life—and perhaps be verified by different entities over a period of time. In the case of EDI, for example, the signatures can be bound to the EDI transaction itself, and may be verified by any future recipients of that transaction, even outside the context of the travelling program. This type of digital signature is analogous to a hand-written signature which appears at the bottom of a paper purchase order or contract.

In addition to being able to sign arbitrary data, the present invention also allows the program to conditionally decide, based on any known criteria, which users should participate in the signature process.

For example, with the present invention, the travelling program can make logical determinations, within the program, as to what co-signature requirements may exist for particular data, user, or some combination. This can include information contained in a user's X.500 certificate, or enhanced digital certificate (e.g., as according to the inventor's U.S. Pat. No. 4,868,877 or 5,005,200). Because complete programmatic flexibility exists, such extracted information can even be used to regulate the future transmission route for the travelling program.

In addition to using digital signatures for simple authentication, the present invention also allows authority requirements and uses to be included and verified as well. This draws upon, for example, the teachings of U.S. Pat. Nos. 4,868,877 and 5,005,200 to control authority proof and delegation.

On the other hand, the present invention also allows uses digital signatures to allow the travelling program to provide other types of valuable authentication. For example, as a security convenience the present invention allows for the digital signature authentication of the entire transmission from one user to another. This includes the travelling program itself, its variables, and any ancillary data or files.

This second type of digital authentication differs from the data-oriented authentication described above, in part, in that it carries long-term significance—since the variables and other data which are transmitted will be changed once the receiving user has taken any action at all. This second type of authentication is therefore primarily seen as a protection against tampering, and can also be used forensically as a backward audit to detect unauthorized tampering even by one of the actual users of the form.

In addition, the present invention also provides a third type of authentication, whereby the travelling program itself may be signed, authenticated and authorized by some trusted issuing authority (e.g., perhaps the author), to insure that no bugs or "viruses" have been introduced. (This even protects against infection by a user which has valid possession of the program along the route).

The present invention provides a unique mechanism for automating data collection among a group of users. The travelling program may be sent to one user, attach (or detach) relevant data files and move on to the next user. Data or files, collected from one or more users can be deposited with another user, or accumulated for batched processing as desired. This methodology eliminates the need for individual users to be counted on to transmit all the required data in the required format.

The present invention also efficiently performs electronic document interchange (EDI) in the context of a travelling program which sends itself from user to to the next within an organization, collecting, editing and approving data. At the appropriate point, as determined by the program's logic, it is then able to programmatically generate a standard EDI transaction (e.g., such as the X12 850 Purchase Order Transaction set) for transmission to another organization. The travelling program is able to digitally sign the finished transaction set. Accordingly, any receiving organization which can process the standardized EDI, and the standardized signature will be able to authenticate and process the incoming material, even if the receiving organization does not have all the powerful techniques available which are taught by the present invention.

Conversely, the present invention allows a travelling program to receive ordinary EDI transaction, possibly signed, and allows them to be parsed and incorporated into its variables. The travelling program then has the capability of validating the input and incorporating them into displays, and to move them among various recipients as necessary.

BRIEF DESCRIPTION OF THE DRAWINGS

These as well as other features of this invention will be better appreciated by reading the following description of the preferred embodiment of the present invention taken in conjunction with the accompanying drawings of which:

FIG. 9 shows how the "program" segment of the travelling program is loaded;

FIG. 10 shows how the "variables" segment of the travelling program is loaded;

FIG. 13 delineates how the "closure" segment of the travelling program is loaded;

FIG. 17 shows the sequence of operations for handling built-in functions;

FIG. 23 shows how a file may be erased from a user's system;

FIG. 26 delineates the sequence of operation performed when material is to be digitally signed;

FIG. 27 delineate the sequence of operation performed by a "INTER-ROLLOUT" function;

FIG. 31 is a routine which demonstrates how the interpreter program permits a user to perform digital signatures;

FIG. 32 exemplifies how a user verifies received information;

FIG. 40 relates to the use of travelling program in receiving an electronic data interchange transaction.

DETAILED DESCRIPTION OF THE PREFERRED EMBODIMENT

Figure 1:
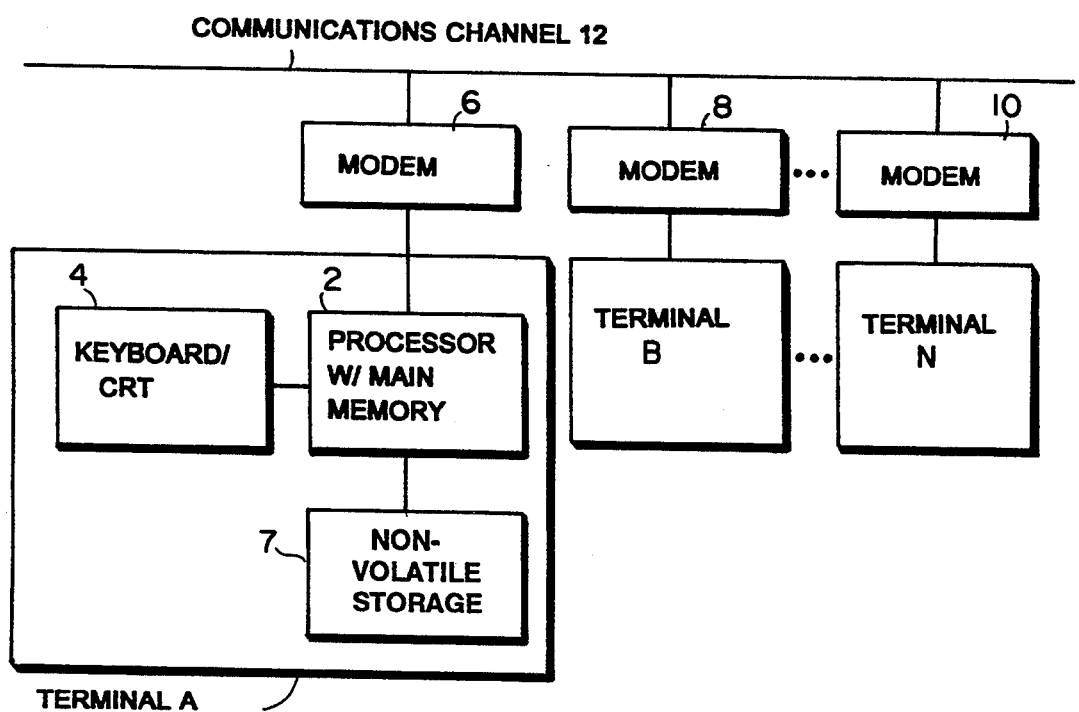
FIG. 1 is a block diagram of a communication system in accordance with an exemplary embodiment of the present invention.

FIG. 1 shows a block diagram showing an exemplary communication system which may be used in conjunction with the present invention. This system includes a communication channel 12 over which communication between terminals A, B, ... N, may take place. Communication channel 12 may, for example, be an unsecured communications channel such as a telephone line.

Terminals, A, B, ... N may, by way of example only, be IBM PC compatible computers, having a processor (with main memory) which is coupled to a conventional keyboard/CRT display 4. The processor with main memory 2 is also coupled to a non-volatile storage which may be a disk memory. Each terminal, A, B ... N also includes a conventional IBM PC communications board (not shown) which, when coupled to a conventional modem (6, 8, 10, respectively), permits a terminal to transmit and receive messages including travelling programs.

As used herein, a "travelling program" is a digital data structure which includes a sequence of instructions and associated data and which has the capability of determining at least one next destination or recipient for receiving the travelling program and for transmitting itself together with all relevant data determined by the program to the next recipient or destination.

Each terminal is capable of generating a message and performing whatever digital signature operations may be required to load and execute the logic, data, and functions inherent within the travelling program (as described more fully herein), and transmitting the message to other terminals connected to communication channel 12 (or to a communications network (not shown) which may be connected to a communication channel 12).

The digital signature and certification methodology described in the inventor's U.S. Pat. Nos. 4,868,877 and 5,005,200, as well as U.S. Pat. No. 5,001,752 may be used herein, which patents are hereby expressly incorporated herein by reference. Alternatively, more conventional digital signature methodology may be utilized.

Before describing the details of the "travelling program" structure and methodology in accordance with an illustrative embodiment of the present invention, an example of the general operation in an actual business transaction context will be briefly described. Initially, presume that the user of the FIG. 1 terminal A is a relatively low level engineer who is a part of a design team in a corporation seeking to obtain component parts to complete a circuit design project.

The engineer using keyboard 4 would access a parts requisition "travelling program" of the type to be described in detail below. The requisition "travelling program" will prompt the engineer to describe the component parts needed. The travelling program includes an instruction sequence which will automatically transmit itself to a next destination, e.g., to a supervisor who has access to terminal B and who is higher up in the organizational structure and possesses the authority to approve the requisition request and digitally sign it. The travelling program may also transmit ancillary information, such as files which may be necessary or useful at future destinations. The supervisor will be prompted to properly digitally sign the request. It is possible that the digital signature reflects not only specific variables values, but also the variable names. Alternatively, the signature may also reflect some aggregate structure which is derived from variables computed within the program, wherein the values may be based on any of many sources, including data read from file, user input, data built into the program, various signer's certificates, or data which is extracted from the user environment (such as the user's ID), etc.

If the request is approved, the requisition form will take a different path in the organization then if it is not approved. The travelling program can have the intelligence to determine, based upon the input from the supervisor at the operating terminal B, where to transmit itself within the organization. The travelling program will also, if desired, load the memory associated with terminal B with the appropriate data relating to the requisition and to attach if desired any files from terminal B that needs to be forwarded elsewhere in the organization.

Once a signature has been done, the travelling program has the ability at any later time, for any later user, for any reason to recompute any material to be verified, and to perform a digital signature verification.

The results of such verification can be announced to any recipient, or more likely, the travelling program can simply perform the verification and announce a problem should there be a failure (which suggests attempted data tampering).

Because the travelling program monitor may embody the teachings of U.S. Pat. Nos. 4,868,877 and 5,005,200, it is possible for authorization to also be checked so that any recipient can be assured that the necessary authorizations were performed.

After a particular data structure has been constructed and signed under control of the travelling program, it is possible to subsequently reconstruct that data structure and to provide its signature to any other entity. Such data can not be subsequently tampered by any entity.

However, the present invention also embodies capability whereby all the transmitted data is digitally signed as it is sent from one user to the next. The travelling program processor in the recipient's computer can automatically verify this signature as the travelling program is loaded. This assures that no component whatsoever is altered or tampered along the way. While this overall signature only reflects the state of the data during this particular transmission, and has no significance for later users, it does insure a perfect transmission untampered by third parties, and it does provide a forensic audit mechanism if it is necessary to trace covert tampering by participating users, while those users had possession of the form. This overall signature differs from current capabilities whereby electronic mail is signed, in that the signature can be conditionally induced by the travelling program itself, as part of the transmission process.

Ultimately, after all the approvals have been obtained within the organizational structure, the travelling program will create an actual Purchase Order.

This could be done in many ways. It may well be possible for a travelling program to support several methods, choosing the one most appropriate for a given circumstance. We describe four possibilities here:

1. The travelling program could simply print out the final purchase order on paper—possibly even printing the company logo, letterhead, etc.—which would be physically mailed.
2. The travelling program, if coupled with an outgoing computer-to-fax capability, could automatically generate a purchase order image, that would appear on the vendor's fax machine. The buyer would not have to produce paper.
3. If it is known that the vendor also supports the travelling program methodology of the present invention, then it is possible that the travelling program will simply designate the vendor as a next destination.
4. It is also very possible that the vendor does not use the present invention, or that the purchaser's travelling program cannot determine with certainty that the vendor is able to handle the travelling program methodology.

Therefore, the travelling program manipulates its internal data to construct a standardized EDI (Electronic Data Interchange) transaction, which can be widely recognized and processed. The travelling program may also cause a digital signature to be performed on the computer EDI transaction, and the signature and the transaction can both be transmitted. The travelling program would then transmit the EDI transaction, as well as any possible signature, to the recipient. (Such transmission is independent of, and should not be confused with, the transmission of the travelling program and its ensemble from user to user as part of its directed travels.)

Any recipient that can handle standardized EDI transactions is then able to handle the received EDI input. Any recipient that can handle digital signatures, is further able to authenticate the transaction. Furthermore, provided the recipient has sufficient software capability to recognize them, the recipient can also automatically validate any authorization that may be embodied as part of the signature. It is up to the logic of the travelling program the extent to which certificates should be transmitted along with a signed transaction.

In any of the above cases, the travelling program can spin off the purchase order (P.O.) information to the vendor, using any of several possible levels of automation. Following this, the travelling program might transmit one version of itself, or possibly just a letter, back to the originator, to inform him that the P.O. has been sent. Other information can be sent to an archive, or to a queue to await further processing. This information could be a simple message, a record added to a file, or perhaps the travelling program schedules a full traversal (automatic "mailing" or transmission).

Figure 2:
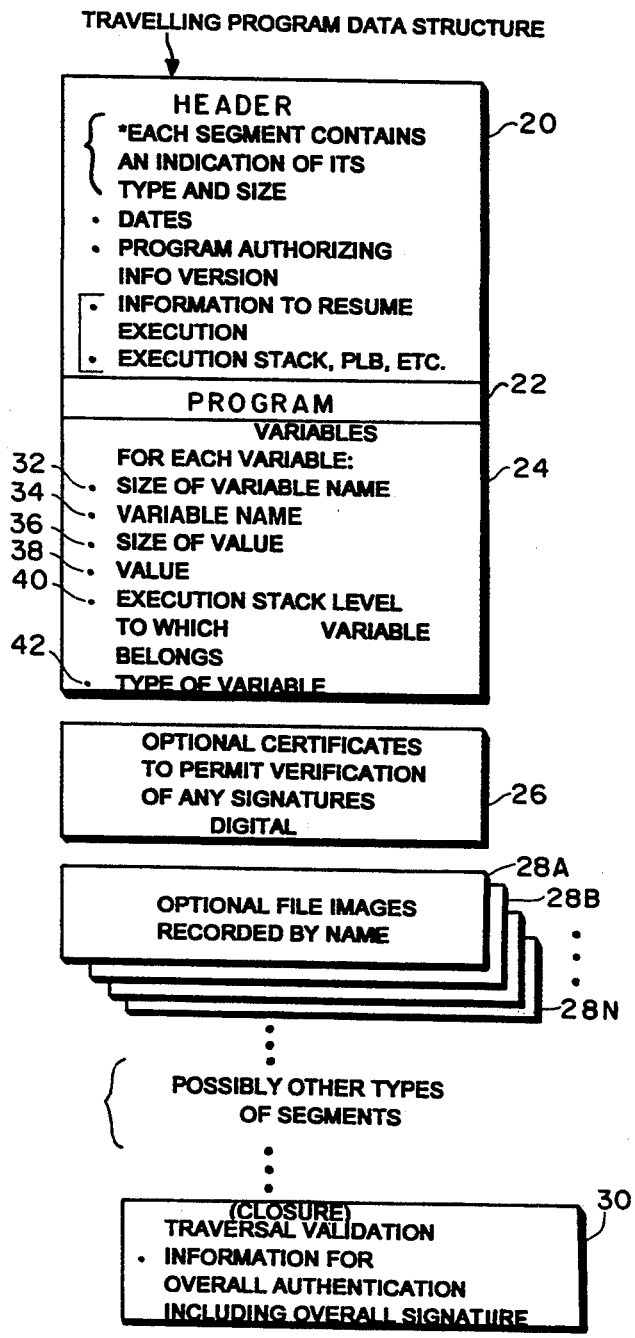
FIG. 2 shows an exemplary structure of a travelling program together with its associated components.

FIG. 2 illustrates the structure of a travelling program together with its associated components in accordance with an exemplary embodiment of the present invention. The FIG. 2 travelling program includes at least the following multi-field segments. A first header segment 20 preferably identifies the size of each of the component segments, the name of the associated program (and possibly other segments described below), the date, the type of each component (e.g., the program is the source language program, or the program is P-code that has already been compiled), the identity of the form, version of the interpreter needed to execute it, data necessary to resume execution at the appropriate point of program resumption (such as execution stacks, PCBs, etc.), dates associated with the latest traversal, and program authorization information (PAI). Each segment in the travelling program structure may include its own description so that the "type of each component and size" field "S" would not be included in the header segment 20. For the purposes of the present application, program authorization information (PAI) may be regarded as security information which defines the range of operations that the associated program is permitted to perform (e.g., defining access to files, the ability to call programs, ability to generate electronic mail, ability to transmit data to other users, ability to release documents, ability to execute machine language programs, ability to access special areas of memory, ability to display information to users, ability to solicit digital signatures, ability to access a digital notary public device, etc.). Further details regarding the nature and use of the program authorization information may be found in applicants U.S. patent application Ser. No. 07/883,868, entitled, "Computer System Method and Apparatus Using Program Authorization Information. The header segment 20 may also include a version number of the associated travelling program.

The travelling program code 22 segment follows the header in the exemplary embodiment and preferably is written in the restructured external execution programming language (e.g., the REXX language) or something akin to PASCAL or COBOL. The program itself may, for example, relate to a purchase order related application.

The travelling program will possess the characteristics described above including the ability to transmit itself to further recipients. Thus, program 22 will include instructions for forwarding itself via whatever medium is available to one or more recipients. This is known herein as a "traversal". One source code instruction or several P-code instructions may be required to result in the "traversal" of the travelling program to one or more identified recipient(s). The travelling program structure set forth in FIG. 2 is designed to be independent of any particular computer architecture and is structured in accordance with international standards (e.g., X.209 format).

The travelling program also includes a "variables segment" 24. Prior to being executed by a first user, the variable segment 24 may be virtually empty. Once the program is sent to a recipient, further variables will become defined as they are required by the program to thereby result in an increasing number of variables as the program is further executed. By way of example only, the variable section 24 may identify a variable, such as "total.dollars.received" together with an actual data value for this variable.

Each variable may have associated therewith the information set forth in each of the fields 32–42 shown in FIG. 2. Field 32 identifies the size of the variable name. The variable name itself is stored in field 34. The size of the value of the variable is set forth in field 36. The value of the variable is in field 38. Field 40 identifies the execution stack level to which the variable belongs. The execution stack level is identified since the same variable name can exist at different levels within a program (e.g., one variable name may exist in a first subroutine while the same variable name may exist in a separate or nested subroutine and yet have a different definition). The execution stack level is helpful in reconstructing the travelling program in a recipient's computer to take on the same logical structure it had in the sender's computer. Field 42 is an optional field which may identify a type of variable, e.g., strings, octets, integers, etc.

The "variables" section 24 may also include a digital signature of the respective variables and related information. Thus, it is also possible for one or more variables to reflect digital signatures which have been taken at various times during the travelling program's execution path. One of the significant aspects of the current invention is that the travelling program can create a digital signature on any type of information. This signature is itself carried as a variable. To verify the signature it is necessary for the program to indicate (or possibly re-compute) the exact value which was signed, and then pass that, together with the signature value (also indicated by a variable) to the VERIFYSIGNATURE function of the travelling program. By including a digital signature of variables, a recipient will be enabled to verify that the data 1) has not been tampered with, 2) has been validly signed, and 3) the signer was properly authorized. See above identified U.S. Pat. No. 5,005,200, which describes a preferred mechanism for associating authority with a digital signature.

A segment 26 is shown in FIG. 2 for optionally including with the travelling program, certificates associated with any digital signatures so that any signatures may be verified by a recipient as described, for example, in the above-identified U.S. Pat. No. 5,005,200. Alternatively, the certificates could be included in the "variables" section together with the digital signatures.

Segments 28A-28N contain file images that are recorded and tagged by name to enable the travelling program to attach and store a file belonging to a travelling program user. Thereafter, the user's file may be transmitted along with other prior user's files with the travelling program. The name of the file facilitates later accessing of the file by a user and permits the travelling program user to identify any file which is, for example, to be further transmitted, or which is to be deposited with a particular user under particular circumstances.

The travelling program also includes a "closure segment" 30 which includes, for example, the digital signature of the entire travelling structure so that the recipient can verify that the transmission of the entire travelling structure has not been tampered with since it was last sent.

Figure 3:
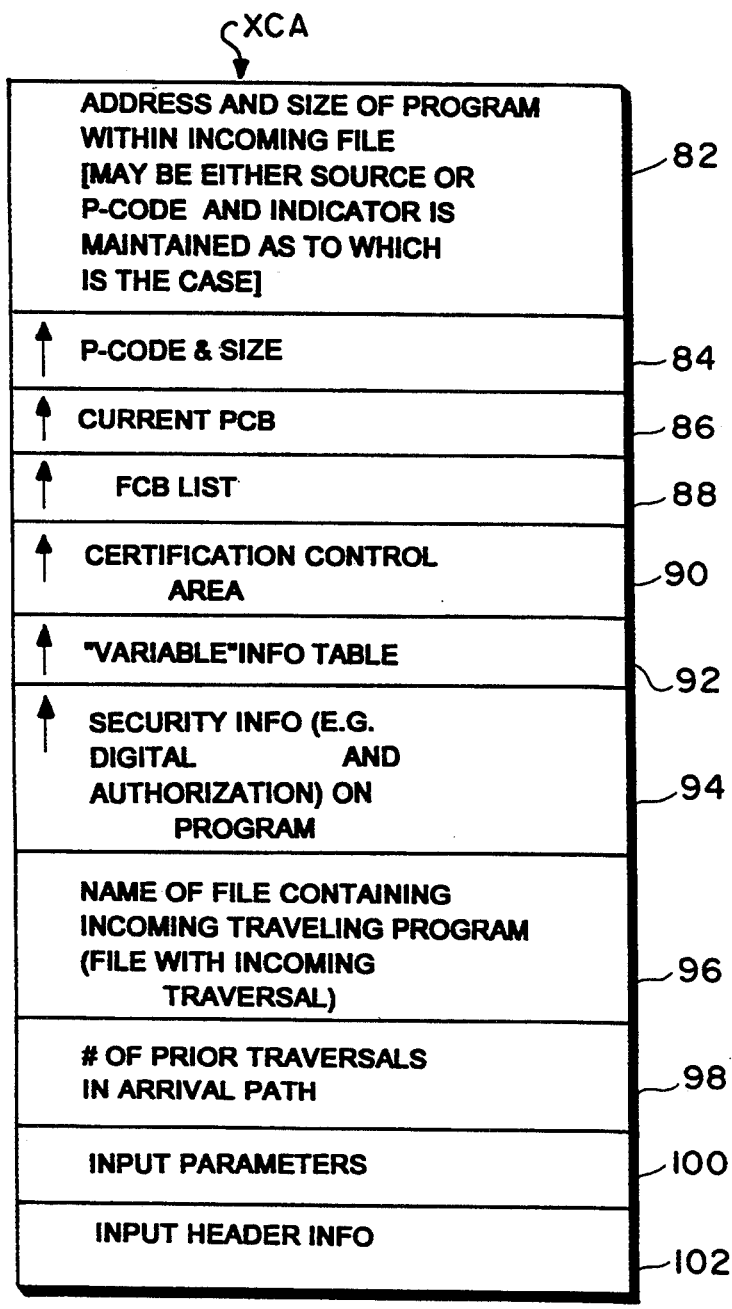
FIG. 3 shows an exemplary execution control area data structure.

Having described the travelling program data structure, we now describe the data structures utilized during the execution of a travelling program and the associated software for executing the travelling program. An execution control area (XCA) data structure is shown in FIG. 3. The XCA specifies information required by the program which executes the travelling program, once the travelling program has been received by a recipient, and compiled into P-code (unless it was originally transmitted in P-code).

As shown in FIG. 3, XCA segment 82 identifies the address and size of the program as it appeared in the incoming file. It should be recognized that, throughout this description, whenever a segment is stated as storing an "address" or "location", that the data may be a physical or logical address and need not necessarily directly specify an actual physical memory location. The program may be received in source or P-code and an indication is maintained as to which is the case. The execution control area includes a segment 84 which is indicative of the address of the p-code version of the program and its size. The address (or pointer to the address) of the current program control block is identified in segment 86. The location of the list of file control blocks (FCB) which is used, for example, to attach and detach files associated with the travelling program is set forth in segment 88. The address of the certificate control area (CCA) which is used for controlling certificates which are attached to the travelling program is set forth in segment 90. The location of the "variable" information table (VIT) is set forth in segment 92 which controls and maintains variables in the form of a "B-tree", which is a hierarchical binary tree structure which identifies the location of each program "variable".

The execution control area also includes a security information segment 94 which may be used for verifying the authenticity and the authority implicit in the travelling program. Segment 96 defines the name of the file that contains the incoming travelling program which may need to be accessed. Segment 98 keeps track of the number of times the program has mailed itself along the incoming path. The execution control area also includes an input parameter section 100, whereby parameters relating to the execution of the program may be identified. Execution control area segment 102 identifies the input header information received from the travelling program file so that the header information will be available.

Figure 4:
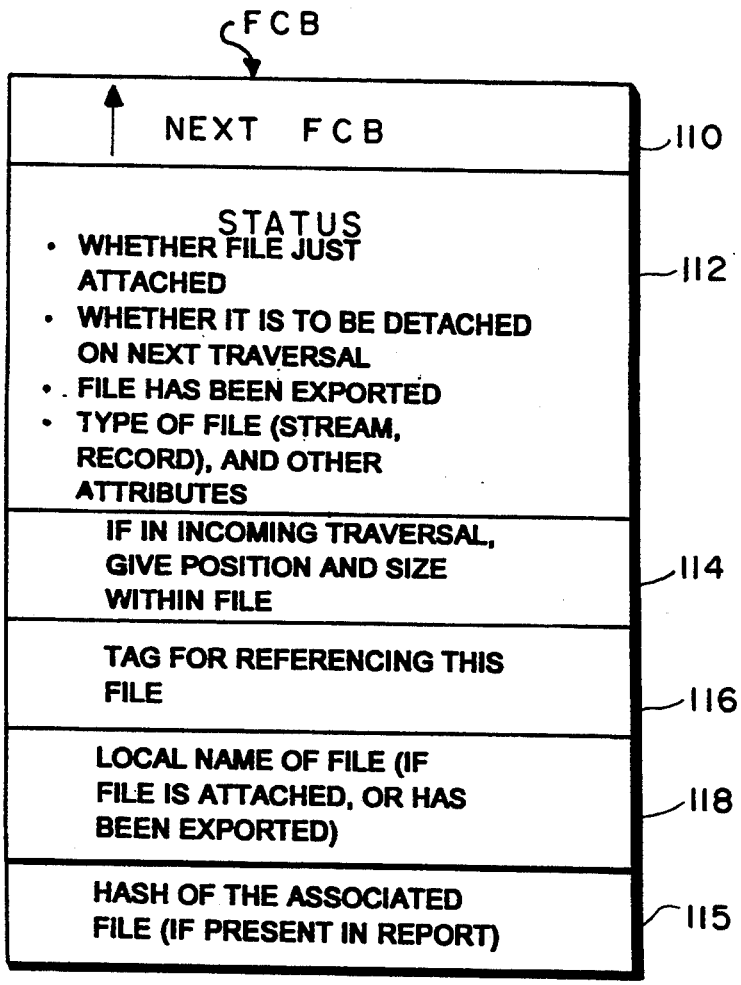
FIG. 4 shows the data structure of a file control block (FCB) which is used when a travelling program attaches files to, or detaches files from itself.

FIG. 4 shows the data structure of a file control block (FCB) which is used when a travelling program attaches files to, or detaches files from itself. The file control block includes a tag field 116 which identifies a tag for referencing a particular file to be attached or detached in a particular user's system. The file control block also includes a segment 110 which is a pointer to the next file control block. The file control block also includes a status segment 112 which defines various status conditions such as whether the associated file has just been attached by the received travelling program; whether the file can be detached on the next traversal (i.e., next mailing); whether the file has been exported (i.e., the associated file image has already been loaded into a separate user file); and an indicator as to the "type of file" such as whether the file is stream oriented or record oriented. Other attributes of the file may be defined in this field.

Segment 114 stores an indication as to the file's position within the main incoming travelling program file so that the particular file in question may be quickly accessed. Segment 118 identifies whether the local name of the file (i.e., the file name identified by the most recent recipient of the travelling program). The local name of the file is typically provided if the file has been attached and is being forwarded to a further recipient or if an already attached file is being "exported", i.e., stored locally by a particular user. Additionally, as shown in FIG. 4, the FCB may contain a hash of the associated file. As will be appreciated by those skilled in art, a hash is a "one way" function which should be computationally easy to compute given the underlying data. The hash function should be computationally impossible given a hash value, to either determine the underlying data, or to create any data which has the specified value as its hash. For all practical purposes, the value obtained from applying a hashing function to the original aggregation of data is an unforgeable unique fingerprint of the original data. If the original data is changed in any manner, the hash of such modified data will be different.

Figure 5:
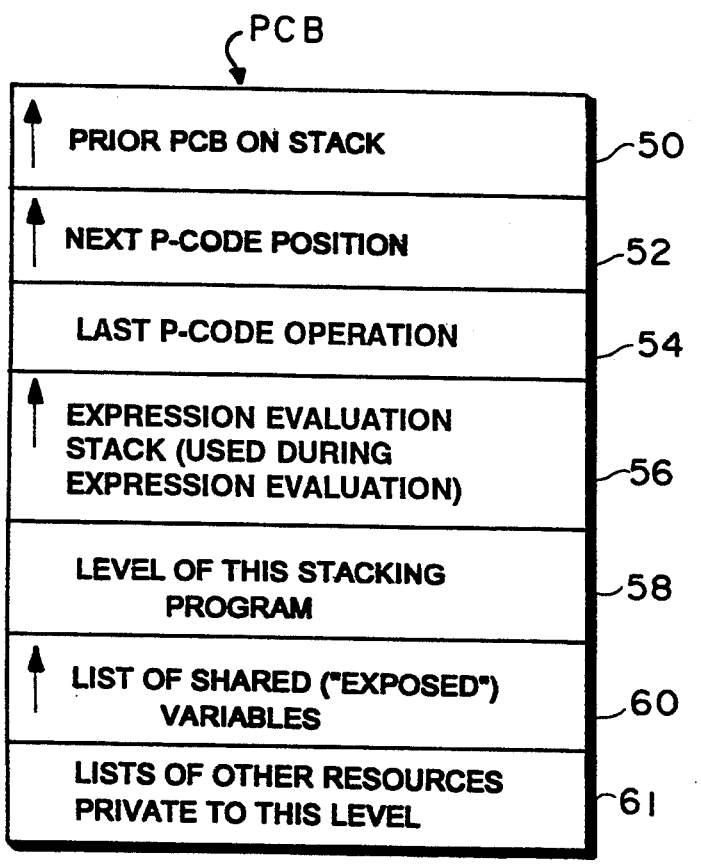
FIG. 5 shows a process control block that is utilized in the execution of a travelling program.

FIG. 5 shows an exemplary program control block that may be used during the execution of the travelling program. A program control block keeps track of control information regarding the program being executed in a structured programming context where one routine calls another routine, each routine having an associated program control block.

The program control block segment 50 points to the prior program control block in the program execution control stack. The program control block includes a segment 52 which defines the next P-code position to be executed in the current executing program and segment 54 defines the type of last P-code operation performed. Segment 56 includes a pointer to an expression evaluation stack which is used during expression evaluation. The execution stack is typically distinct from the program stack, in that the execution stack is used for evaluating expressions and keeping track of internal state. Segment 58 defines the level of this stacking program and segment 60 defines a pointer to a list of shared variables. In the REXX language an "exposed" statement may be used for accessing shared variables.

Figure 6:
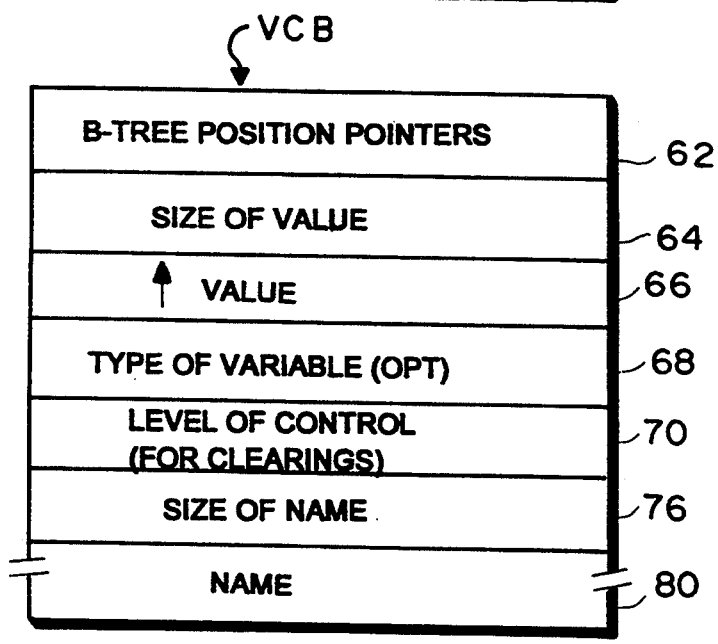
FIG. 6 illustrates a variable control block data structure (VCB) which is used for controlling variables.

FIG. 6 illustrates a variable control block data structure (VCB) which is used for controlling variables. Segment 62 identifies where in the B-tree a variable is located and may contain several pointers. Segment 64 identifies the size of the variable value and segment 66 identifies a pointer to where the value is located in memory. Segment 68 may be optionally used to identify the type of variable. Segment 70 identifies which level of the travelling program the variable is associated with, so that after the program is executed, any local variable which was associated with the program may be readily deleted. Segments 76 and 80 identify the size of the variable name and the name, respectively.

We now turn to illustrating the execution of the travelling program. The sequence of operations performed by a "loader" portion of an interpreter execution-driving program is set forth in FIGS. 7–12. These operations relate to preparing to execute a travelling program.

A travelling program may execute in one of a plurality of different modes such as an interactive user mode, a mode in which it is called by another program, or a batch operation mode in which it is sent from node to node collecting information. Initialization information is input during the start-up operation (120) to identify the particular operating mode as well as associated run-time parameters.

The flowcharts set forth in FIGS. 7–12 illustrate how a travelling program structure shown in FIG. 2 is loaded. In loading the travelling program, the interpreter creates the execution control area XCA and initial program control block PCB. It saves access to input parameters, saves the names of the input files that it has been given to load and initializes the variable information table (VIT) (122). In flowchart block 122, the execution control area and program control block associated with the travelling program are established. The various XCA and PCB fields are filled in during subsequent processing.

Thereafter, the loader begins loading travelling program segments, i.e., header, program, variables, certificates, file and closure segments as shown in FIG. 2. Loading each of the travelling program segments described above, e.g., header program, etc., causes appropriate data to be filled in as described below.

In block 124, a decision is made as to whether more segments need to be processed. If so, then the initial input is read for that segment and the type of segment is determined after which segment processing is initiated depending upon the type of segment (126).

Figure 8:
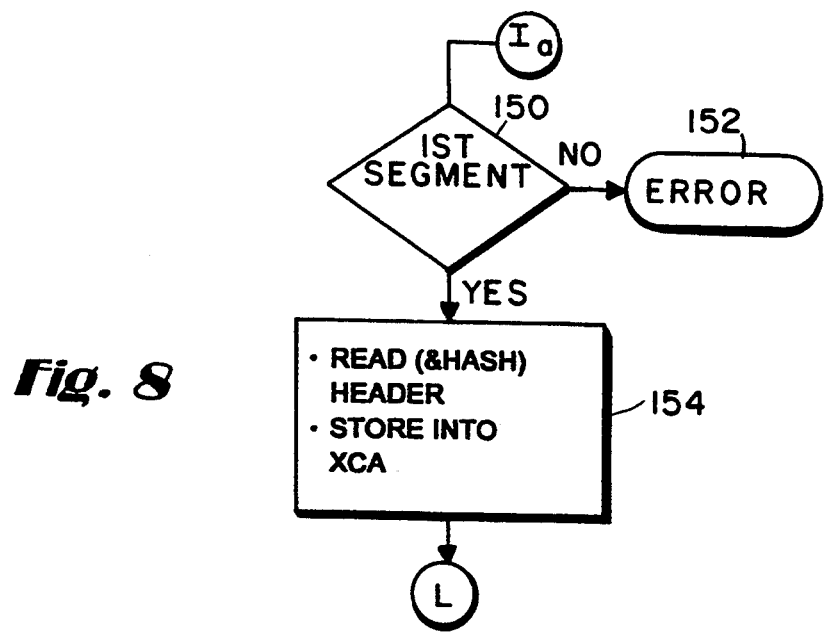
FIG. 8 shows how the header is loaded.

Turning to the header processing of FIG. 8, initially, a check is made to determine whether the segment being processed is the first segment (150). If not, then an error condition exists (152) since the header must be the first segment. If the first segment is being processed, then the header is read and hashed. The header data is stored into the XCA (154).

Figure 7:
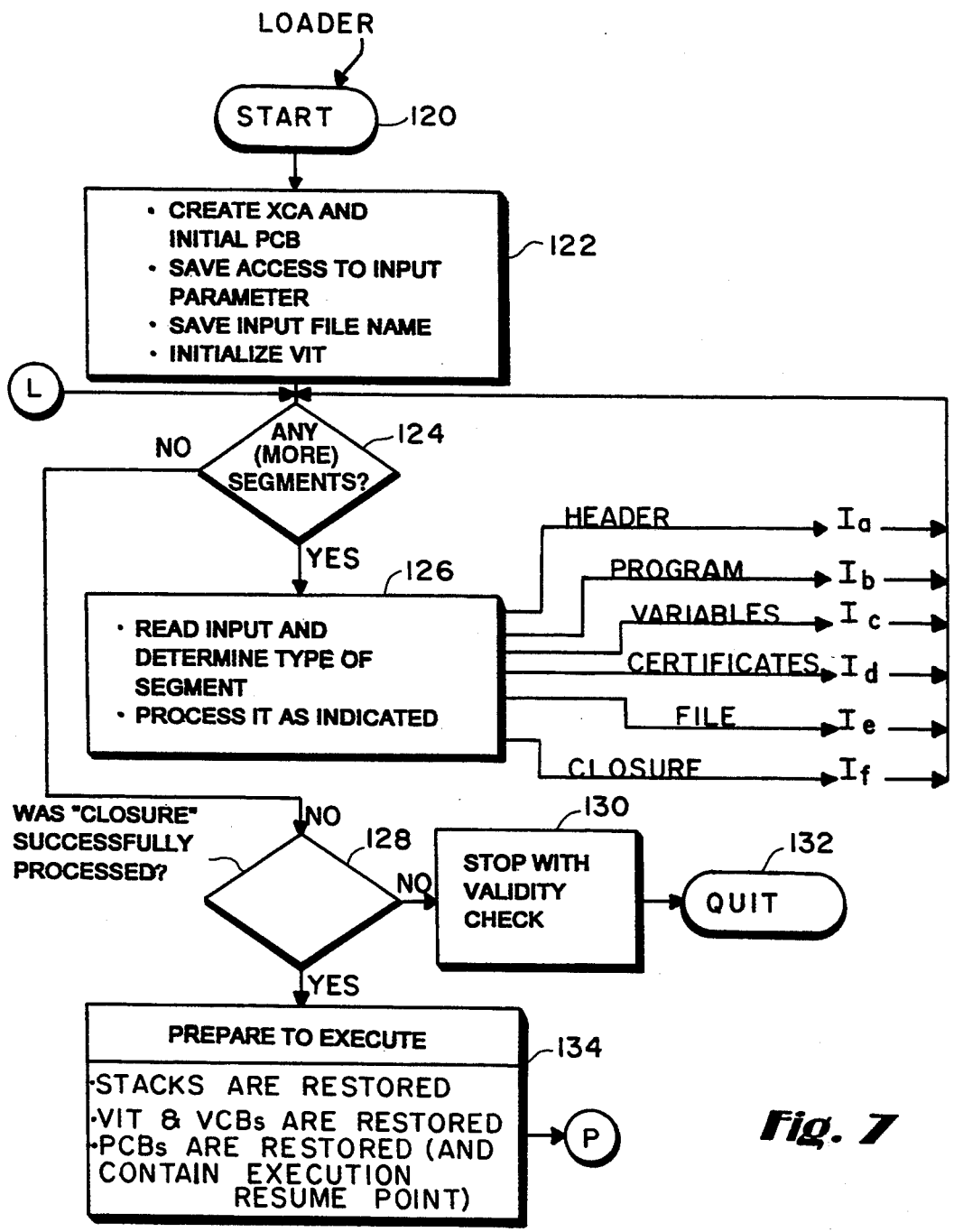
FIG. 7 shows an exemplary travelling program loader.

The routine then branches back to FIG. 7 at entry point L. The loader determines whether there are any more segments to be processed (124). If so, block 126 is executed to result in the processing of the "program" segment as shown in FIG. 9. Initially, a check is made to determine whether there is a header, and no program has yet been loaded (160). If the answer is no, then an error condition exists (162). If the answer is yes, then the program is read and a hash is taken (164).

Thereafter, the program hash and/or digital signatures associated with the program (and/or the header) are verified 166. If the digital signatures were not properly authorized or could not be verified, then an error condition results 166. If verification occurs, then any security and authorization information associated with the travelling program is saved (170). Such authorization information could alternatively be kept in the header or in the program segment.

In block 172, a check is made to determine whether the program has been sent as P-code. If source code rather than P-code has been sent, then the source code is compiled into P-code using conventional compiler techniques known to those skilled in the art and the source code image is deleted from storage 174. Regardless of the check at block 172, the position in the incoming file of the program—whether it is in source or P-code format—is saved in the XCA. Knowing the location and extent of the incoming image simplifies the copying of the program into eventual outbound traversal(s). Finally, regardless of whether the P-code was just compiled, or whether it was read form the incoming file, the main storage address and size of the P-code is set into the execution control area (XCA) in 178, after which the routine shown in FIG. 7 is reentered at block 124 to thereby result in loading remaining segments such as the "variable" segment processing shown in FIG. 10.

In processing the "variable" segment as indicated in block 190, a check is made to determine whether the header and program have been loaded but no prior variables. If this is not the case, then an error condition results 192. If a header and program have been loaded, but no prior variables, then we begin an iterate process to read all the variables, if any. A check is made at 194 to determine whether there are (more) variables to read. If there are more variables to read, then for each variable, a variable control block (VCB) is created as shown in FIG. 6 and is completed by the insertion of a variable identifier and value into the variable control block (VCB) and the setting of certain status conditions in the VCB. Additionally, the variable control block is added to the proper spot in the variable information table (VIT), the table which contains all program variables (196).

Additionally, other variable information, for example, related to previous executions of the travelling program are loaded into memory stacks or program control blocks as appropriate 198. Alternatively, it may be desirable to keep such "control" information in the header segment rather than here. Thereafter, the routine branches back to block 194, where checks are made to determine whether more variables are required to be read. The processing continues until no more variables need to be read, at which point the routine branches back to block 124 of FIG. 7 to thereby result in loading the next segment.

Figure 11:
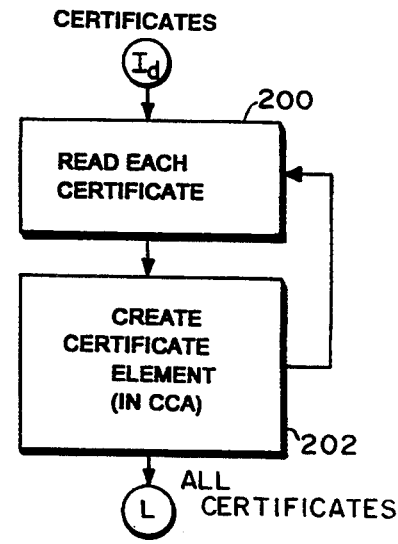
FIG. 11 shows how the "certificate" segment of the travelling program is loaded.

As indicated in FIG. 11, each certificate is read (200) and a certificate element is created which is then added to a certificate control area (CCA) in storage (202). As schematically indicated in FIG. 11, the process is repeated until all certificates are received at which point the routine branches back to block 124 to check for any more segments.

Alternatively, it may be desirable to transmit the certificate segment ahead of the program segment, so that certificates used as part of program authentication/authorization can be maintained together with any certificates used by program variables and user-to-user authentication.

Figure 12:
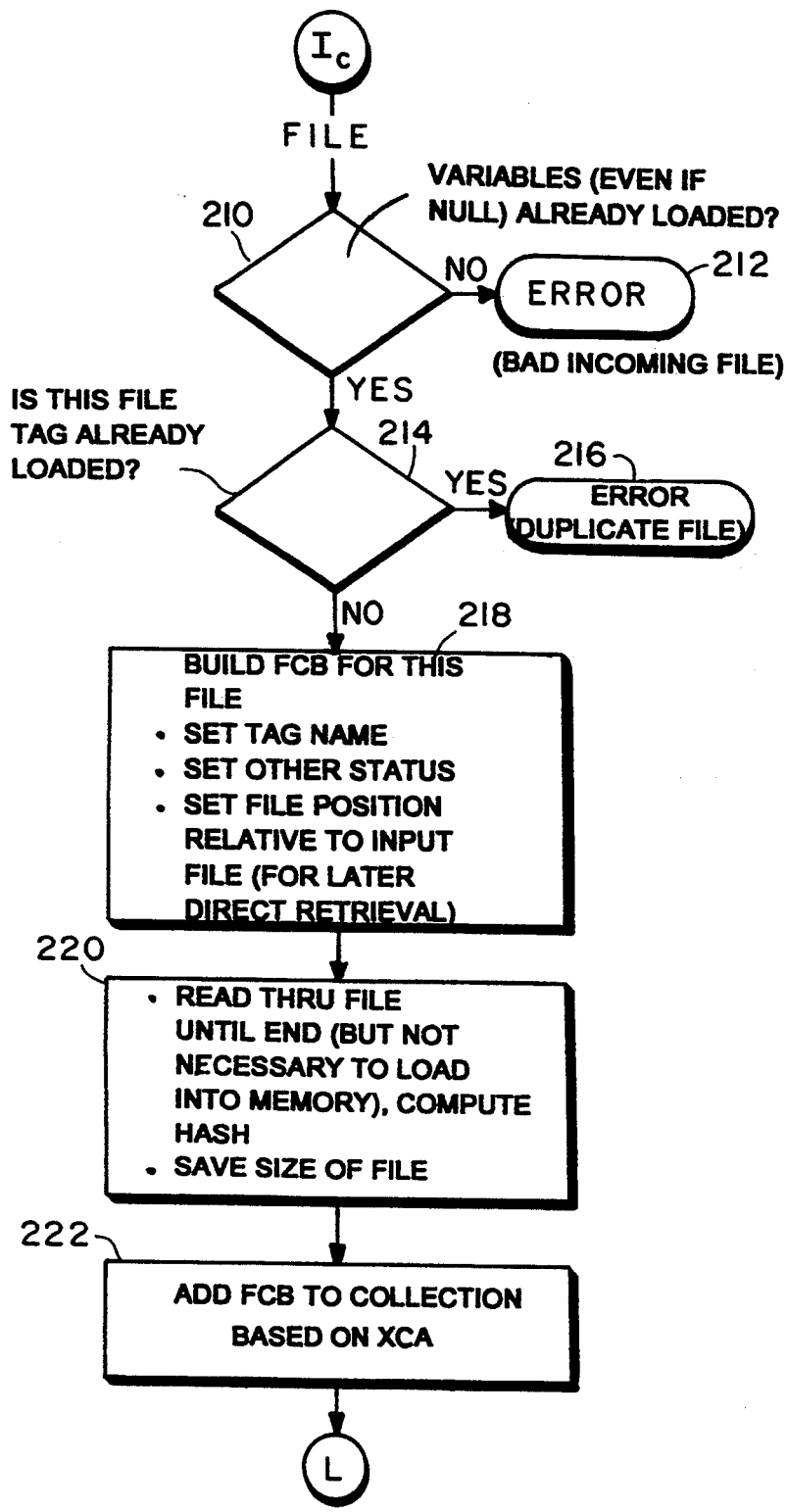
FIG. 12 shows how the "file" segment of the travelling program is loaded.

This branching operation results in the "file" segment processing shown in FIG. 12. Since the file segments typically follow the "variable" segments, a check is made to determine whether the variable segment (even if null) has already been loaded. If not, then an error has been detected and an appropriate error message is generated 212. If the "variable" segment has already been loaded, then as indicated in block 214, a check is made to determine whether the file tag associated with the file has already been loaded. If so, then an error is detected indicating that the file has been duplicated 216.

If the file tag has not already been loaded, then as indicated in block 218, a file control block is built for the file, the tag name is set, other status indicators are set that may have already been associated with the travelling program, and the file position is set relative to the incoming file.

Thereafter, the file is read and its hash is computed and saved in segment 115 of the FCB. The size of the file is saved in segment 114 of the FCB. The file need not be loaded into memory at this time (220). Thereafter, the file control block which has been created is added to the file control block list collected in the XCA and the routine branches back to block 124 to process the next segment (probably "closure").

In the "closure" processing in FIG. 13, the hash is computed of all previous hashes for each previous segment (230). It should be recognized that all the "segment" material is read subject to hashing. A check is then made in block 232 to determine whether the hash taken and calculated in 230 matches the hash added when the travelling program was sent (which is stored in the closure segment). If there is no match, then an error condition results 234.

If there is a match, a check is made as to whether the travelling program is signed (236). If not, then as suggested at block 238, an action is taken to incorporate whatever level of security is desired, such as possibly presenting a notification that the transmission data is not entirely signed (238).

If the transmission was signed, then the signature is verified and a message is presented to the user to accurately identify the party who actually sent the travelling program (and the associated purchase order or other form) 240. The routine then branches back to block 124 of FIG. 7.

The completion of the "closure" processing in FIG. 13 results in block 124 determining that there are not more segments to be processed. Thereafter, a check is made to determine whether closure was successfully received and processed (128). If it was not, then the routine stops execution after performing an unsuccessful validity check (130) and processing halts 132.

If the check at block 128 reveals that closure was successfully completed, then various steps are taken to prepare for program execution (134). In this regard, stacks are restored, the variable information table and variable control blocks are restored. The program control blocks are restored such that they contain the execution resumption point.

Figure 14:
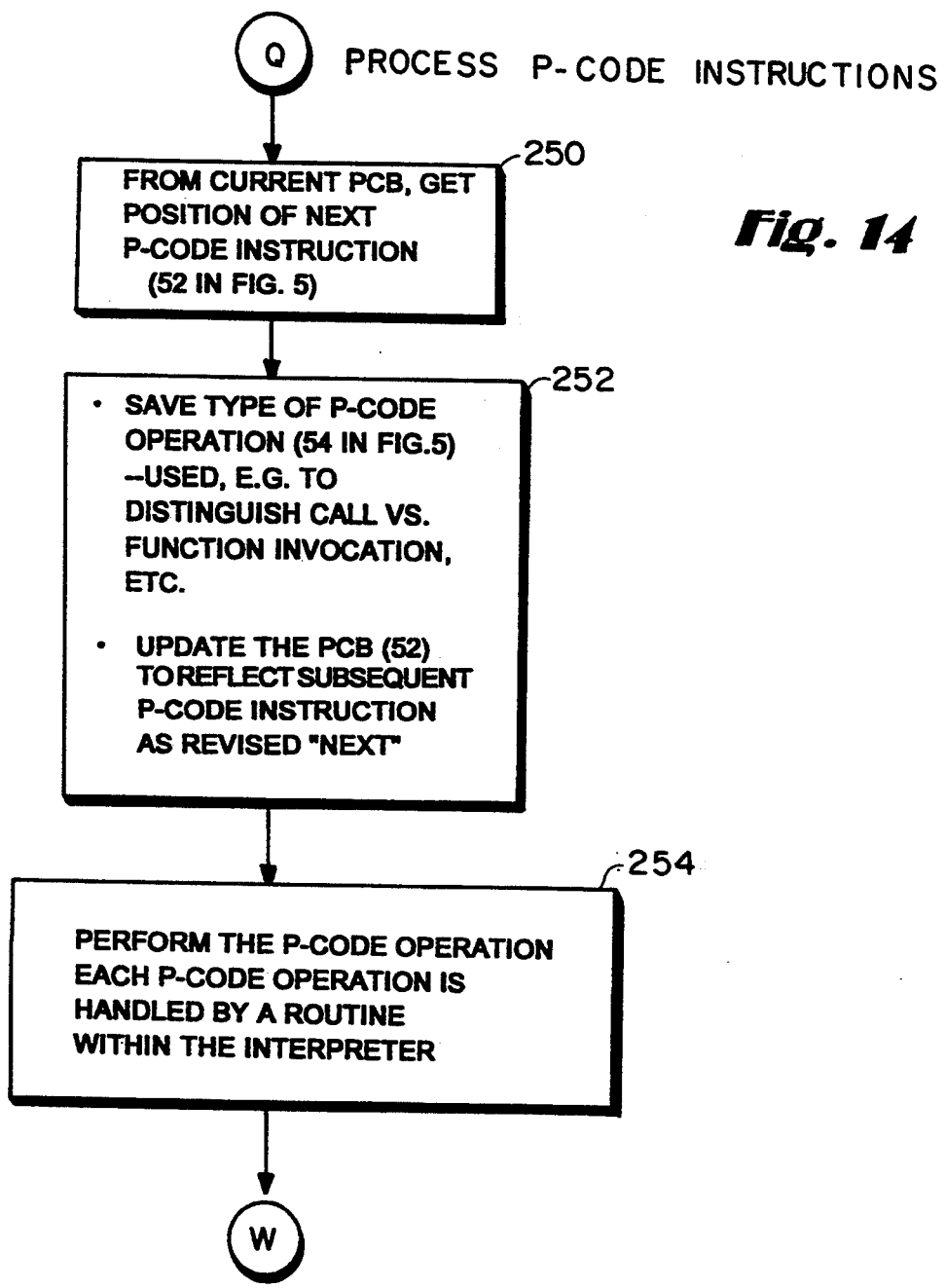
FIG. 14 represents the operations performed in processing P-code instructions.

Thereafter, the routine shown in FIG. 14 is initiated to actually process the P-code instructions. The following problem must be considered here. Because the program execution is effectively restored identically to the state it was at the time it was transmitted (as part of the traversal) from the sender's machine, there is an issue of how the travelling program can distinguish whether it is in the sending machine, and just returned from the sending itself; or whether it has just been restored in the recipient machine.

The present invention allows multiple ways to address this problem. If the traversal function is implemented as a built-in function, then the interpreter will return a special value (say "0") to the program after it has successfully sent itself, and another value (say "1") to the program when its execution is restored on the recipient's machine. The travelling program can then test this value to distinguish the situation. Another way this distinction could be made is by providing the travelling program a function to extract the "number of prior traversals" (segment 98 in the XCA). Before invoking the traversal, the program could use this function to save the prior-traversal-count function. If it matches the value of the variable, then the program knows the execution is resuming in the sender's computer; if it differs (and it should only be one greater), then the program knows the execution is resuming at the recipient's computer.

When the first user generates the travelling program, the loader routine shown in FIG. 7–13 is executed with very few, perhaps no, variables, files, or certificates. Accordingly, certain of the above-described steps will be omitted during the initial processing. The loader routine is executed whether the travelling program is executed for the first time or executed by further recipients.

FIG. 14 illustrates the operations performed in processing P-code instructions; it is repeated for every P-code instruction executed. As indicated in block 250, the location of the next P-code instruction is derived from the current PCB (52), and this becomes the "current" P-code operation. In block 252, the length of this P-code operation is determined, and the "next P-code" position (52) is updated to reflect the subsequent P-code instruction. The type of the current P-code operation is saved in (54) (It is useful for the interpreter to share common routines which have slight variations based on the precise operation. For example, the "call" operation and the "function invocation" operation are similar except that the function invocation expects a parameter to be returned).

Thereafter, as illustrated in block 254, the indicated P-code operation is performed. Most P-code functions involve data manipulation, logical tests and program flow control. By way of example only, such P-code operations may include locating a variable and pushing the variable in a stack, resetting the next P-code operation to thereby change the flow of control such as would occur in a branching operation, performing an arithmetic or string operation, performing IF/THEN/ELSE operation based on the popped stack value, perform DO/ITERATE/UNTIL/WHILE, or other operations based on stack values, performing SELECT/WHEN/OTHERWISE operations based on the stack values, performing an "END" operation to close a DO/WHEN/SELECT operation.

We will soon discuss in some detail various P-code operations pertinent to the present invention's unique operation. With the guidance given herein, the P-code functions can be implemented in a straight-forward manner by anyone familiar with writing interpreters.

However, ignoring for the moment the details of the particular P-code function, the preferred design allows for P-code operations to generate logical "interrupts" at their completion.

These allow processing P-code processing to be suspended while some other, external operation must be performed. This interrupt concept is used in the preferred design to facilitate the rollout of working storage whenever lengthy waits or external activity is invoked.

Figure 15:
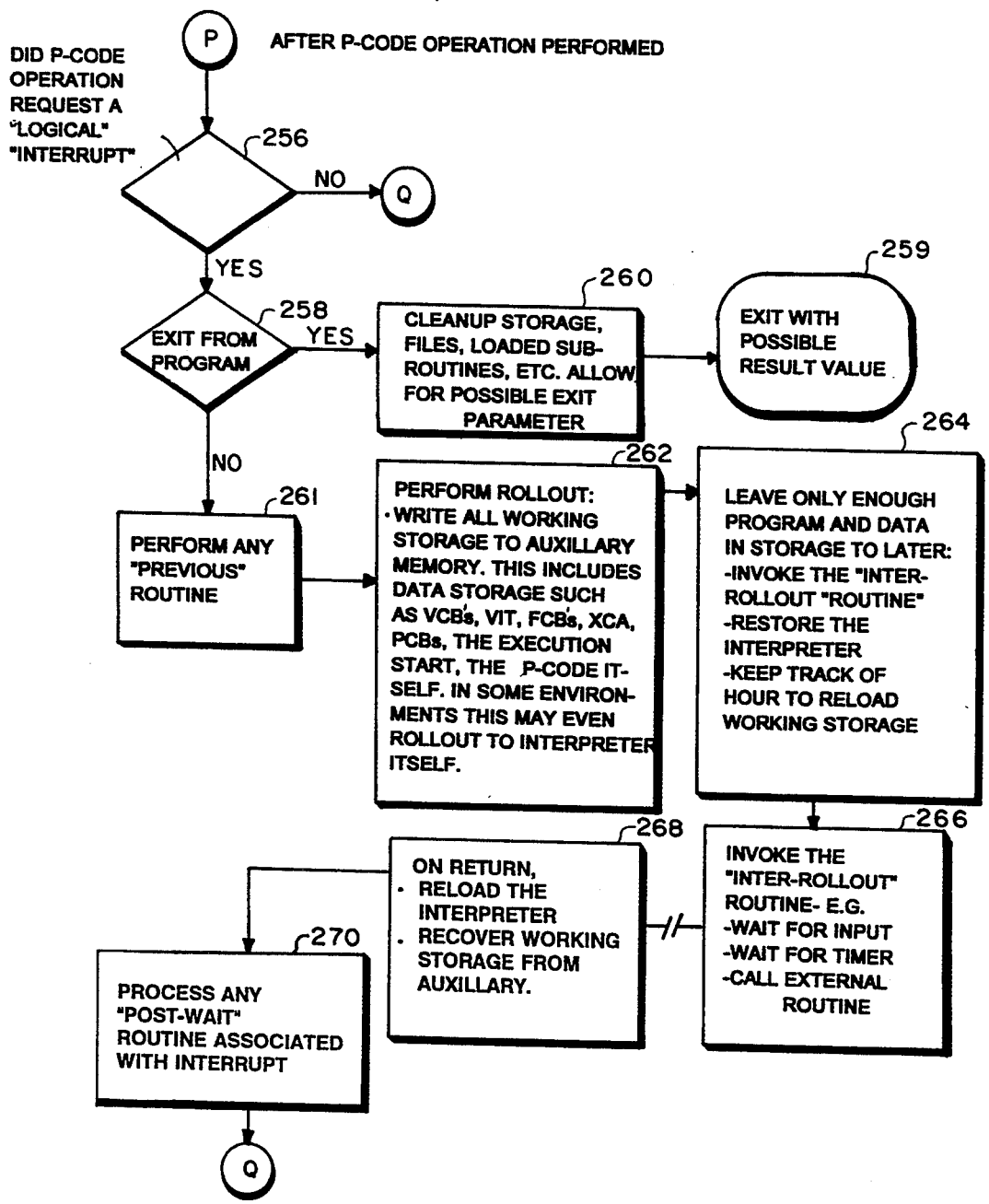
FIG. 15 shows processing which takes place after the P-code operation is performed.

In FIG. 15, on return from the P-code routine in block 256, the interpreter determines whether the routine has signaled a logical interrupt. If not, then return is made to 250 to handle the next P-code operation.

If an interrupt was indicated, a special check in block 258 is made to determine whether this is the special "EXIT" request. If so, then all resources which should be released at the end of this program, such as storage, files, variables, load subroutines, etc., are discarded in block 260. A possible return value from the P-code operation, which may have been saved by 260, is returned in block 259 to the invoker of this travelling program.

Assuming, this is not EXIT, then block 261 determines whether ROLLOUT should be performed. For example, in certain environments, it is useful for working storage to be rolled out while a user completes entering input, or while the travelling program is waiting for a time interval to expire, or while a lengthy (or large) external program has been invoked from the travelling program logic, or while the digital signature routine is being executed (since that often involves user input).

Routines which cause a P-code interrupt and a possible ROLLOUT, regardless of whether they are implemented as built-in functions or as language statements (with their own P-code), include:

SIGN which applies a digital signature to any computer data, and in doing so may solicit the user to select from multiple certificates, and solicit the user to provide his secret password key which allows the private signature key to be decrypted and used;
DISPLAY compose and output a screen and wait for the user to supply input;
TIMEWAIT suspend execution until a future time is reached;
SELECT.FROM.DIRECTORY which allows selection from, e.g., a directory of users, or a directory of files, etc.
NOTARIZE wait for a time notary device to apply its own digital signature.

In some environments, ROLLOUT is pointless, and in these cases the rollout and rollin processes in block 262, 264, 268 will be absent or inhibited.

In any case, a P-code operation which signals an "interrupt" also supplies the address of at least 3 associated ("call-back") functions the pre-rollout routine, which performs any required functions in preparation for rollout. This might include preparing a parm field in temporary storage to pass to . . .
the inter-rollout routine which executes after as much working storage as possible has been rolled out to auxiliary storage.
the post-wait routine which handles details following the rollback after the inter-rollout routine is finished, and after working storage has been restored from auxiliary. Typically, this involves copying a result value computed by the inter-rollout routine which is left in temporary storage, and which must be loaded onto the execution or copied into a program variable.

In block 261, the pre-rollout routine is invoked. This may be a null routine, or it may setup, e.g., parameters for the inter-rollout routine.

In block 262, the rollout function is performed, if appropriate given the environment and circumstance.s If done, then ROLLOUT consists of writing all working storage, including the VCBs and their values, the FCBs, the certificates and the CCA, the execution stack, the VIT, the XCA, the P-code itself, and any other blocks, to some auxiliary storage (such as a file). The interpreter itself may be released from storage, and this may be done in a special block (264), provided that sufficient residual program and data remains to later reload the interpreter and the working storage.

In step 266, the inter-rollout routine is invoked. Typically, this routine waits for the user to enter input, or to wait until a future time or other event, or to invoke another program which might wait for input, or cause other delays, or require a large of storage which is vacated by the ROLLOUT.

In block 268, after the inter-rollout is finished, the interpreter is reloaded, then the working storage, including the P-code, the execution stack, all control blocks are restored from auxiliary storage.

Then in block 270, any final processing is done to tidy up the operation. For example, this typically includes copying a result returned by the inter-rollout routine to the execution stack, or to a program "variable".

This completes the interrupt, and control is then returned to the top of the P-code handler (250), where the next P-code instruction is processed.

We now examine some P-code operations of interest.

The interpreter in the preferred embodiment handles three of CALLs and function: to routines which are "built-in" to the interpreter, to routines which are written as part of the travelling program, and to routines which are external to the interpreter or program, and which are dynamically located and invoked when the program is executed.

In FIG. 17 we see that the built-in function appears rather simple, and the interpreter simply locates the specified function based on an index in the P-code, and lookups the routine's address (within the interpreter), and calls it. However, it is important to realize that, while most do not, some built-in functions might signal a P-code interrupt. In this case, the built-in function must provide the necessary pre-rollout, inter-rollout and post-wait routines.

The P-code interpreter always distinguishes CALL and functions, and provides for the return of a result to the execution stack in and only in the case of a function. For example, the SIGN function returns a value which represents the digital signature computed on the supplied data.

Figure 16B:
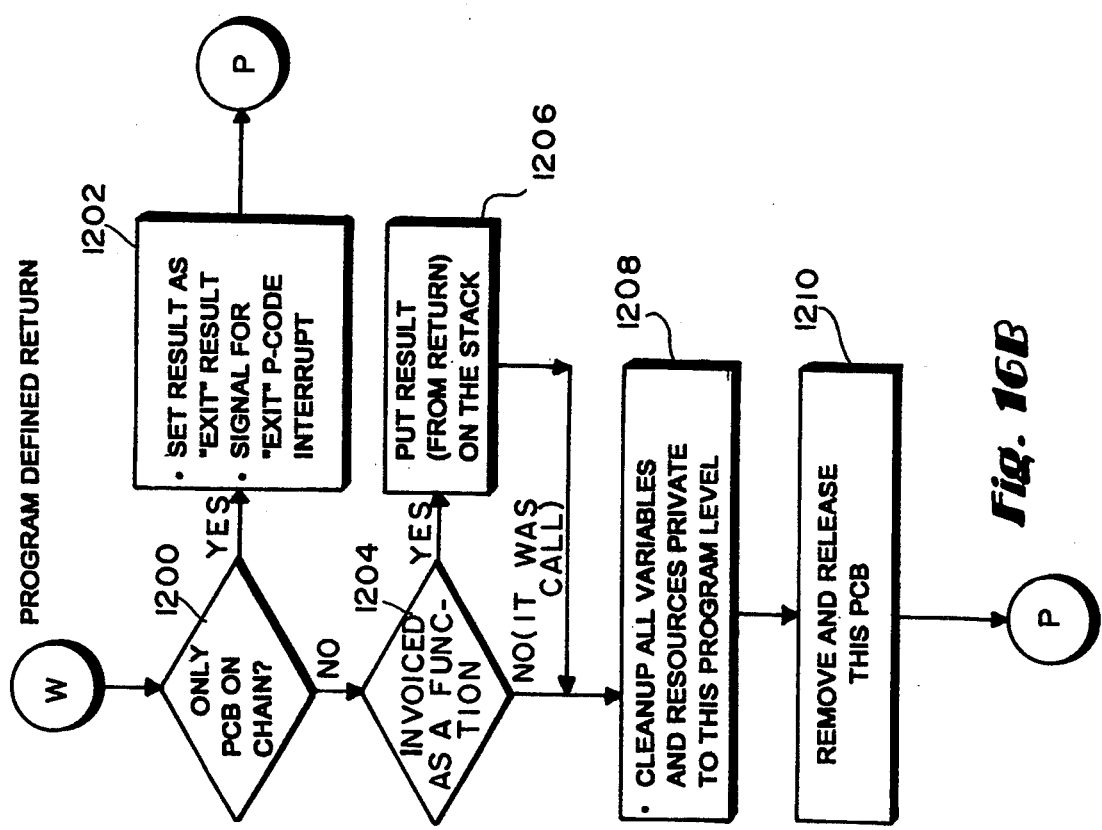
FIGS. 16A and 16B show processing for handling program defined functions or calls.
Figure 16A:
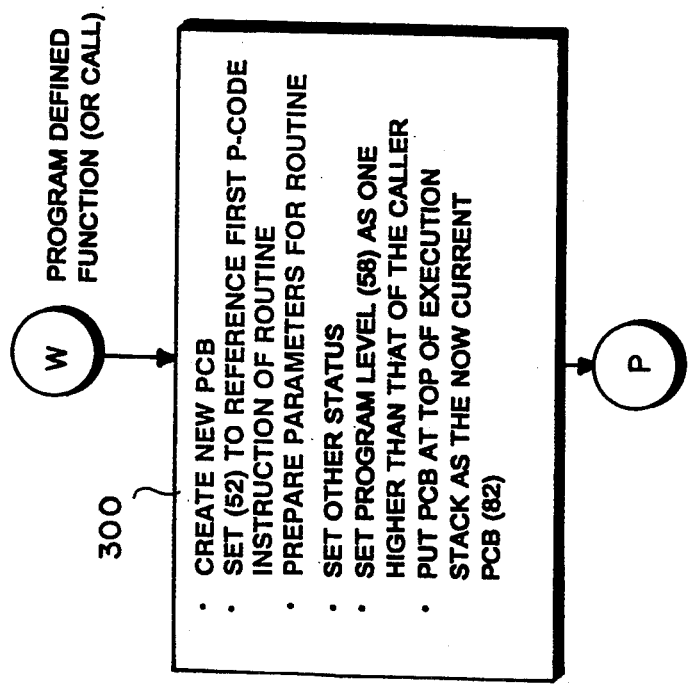

In FIG. 16A we see that a call/function to a program routine causes the creation of a new PCB execution level 300. The new PCB is set to start executing at the start of the subroutine, by setting the next-P-code instruction (52) to the P-code entry point of the routine. The first instruction of the routine will be accessed when block 250 is reentered. Parameters are prepared for the program routine, appropriate status condition are set, the program level 58 in the PCB is set to one higher than the calling program and the PCB is placed at the top of the execution stack as the now current PCB (82). The result of a program routine is passed to the caller through the P-code RETURN operation.

In FIG. 16B, we see how the corresponding program RETURN P-code operation operates. Block 1200 determines if a RETURN is made from the highest (only) level PCB, in which case this operates as an EXIT, and block 1204 signals that a P-code "EXIT" interrupt is required and passes the return RESULT (if any) as the value to eventually be returned by block 261 (FIG. 15) as the RESULT for the entire program.

Otherwise, in block 1204, determination is made as to whether the invoker used a CALL or function (e.g., by checking field 54 in the caller's PCB), and in the latter case block 1206 puts the return VALUE on the stack (or creates a default value if the RETURN had no operand).

In block 1208, the current level is cleaned-up, and all resources, including storage, files, variables, etc private to this subroutine (aka "program level") are released. Resources, such as variables which are shared with the caller are NOT released and are available.

In block 1210, the current PCB is then released so that the caller's PCB now becomes the current one, and return is made to block 256 where execution resumes.

The interpreter includes built in routines which are designed to accomplish specialized travelling program related functions relating to providing digital signatures, user files to the travelling program and other functions to eliminate the need for a travelling program designer to be concerned with programming such functions.

P-code operations may also involve the performance of a RETURN function which will affect program control, a PROC operation which relates to program control block, The interpreter also performs a DISPLAY operation which utilizes the interactive display methodology/language described herein. The interpreter also performs a TRAVERSE operation which results in the "mailing" of the travelling program to another recipient as well as all associated data.

Figure 18:
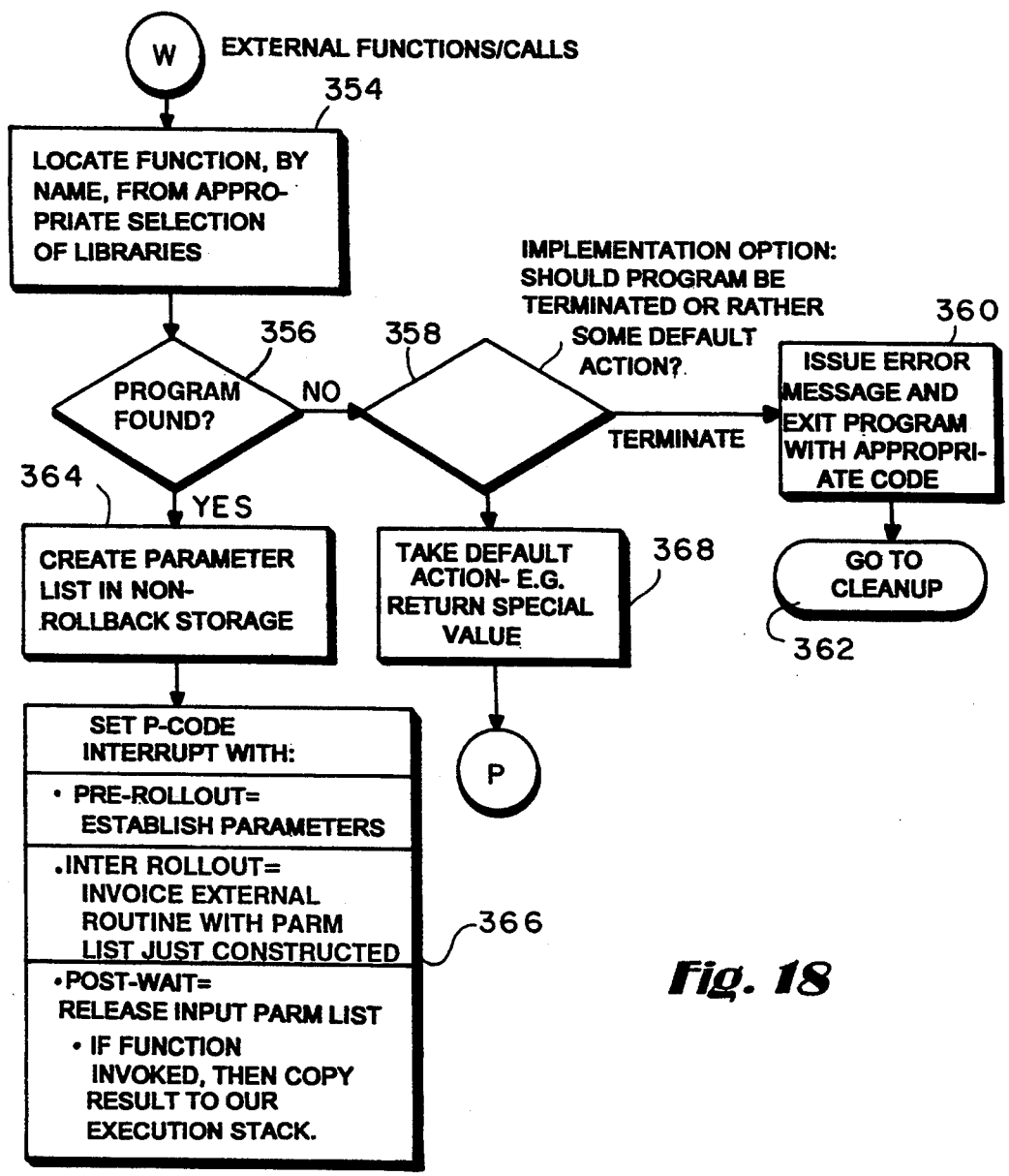
FIGS. 18 and 19 delineate the sequence of operations performed for executing external functions or calls.
Figure 19:
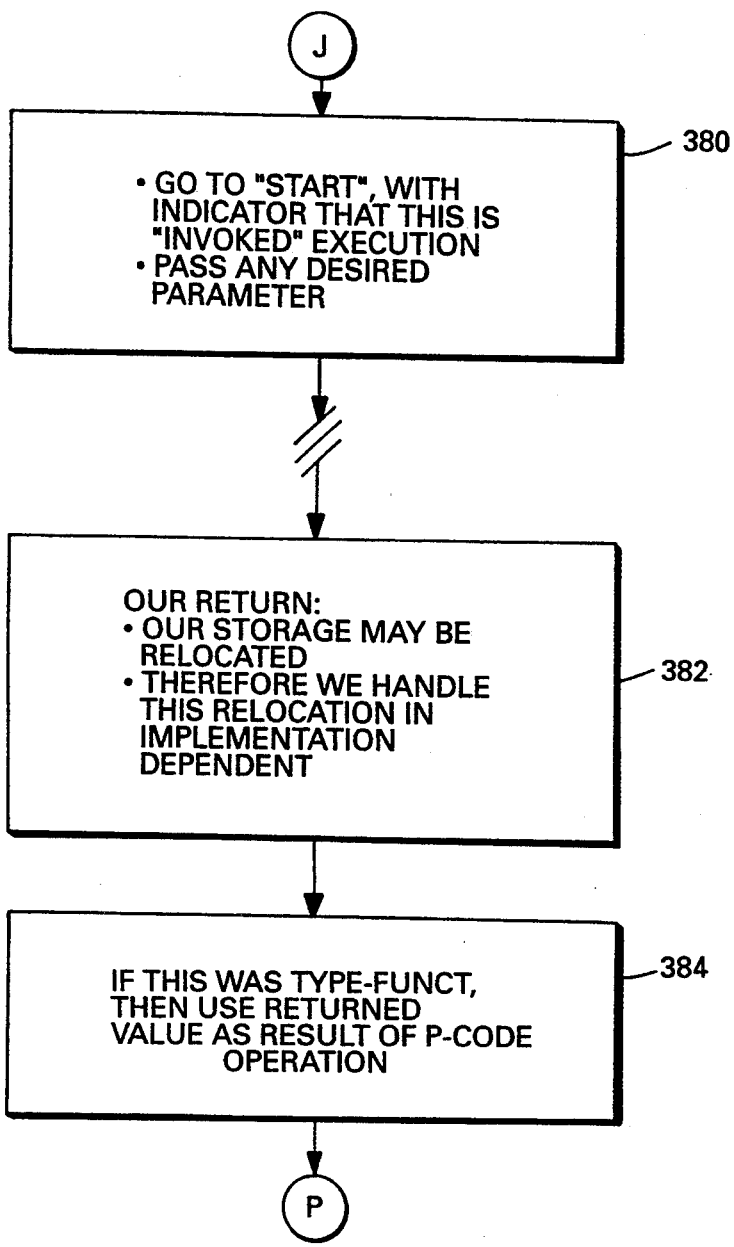

FIG. 18 illustrates an exemplary the sequence of operations performed for executing external functions or calls. Such external functions or calls are not built in to the interpreter or part of the travelling program but rather are part of the user's program library. The named function or call is located from any of several possible libraries 354.

A check is then made to determine if the program is found 356. If the program is not found, then a check may, if desired, be made to determine whether the program should be terminated or some default action be performed 358. If a decision is made to terminate, then an error message is generated, and after various housekeeping/cleanup operations are performed as described above the program is exited (360, 362).

If the check at block 358 indicates that a default action should be taken, then the default action is taken, e.g., by returning a special default function value (368) and the routine branches back to node 0 in FIG. 14 to begin executing further P-code instructions.

If the program is found as a result of the check made in block 356, then parameters are constructed by the program (364). Invoking external routines involves a P-code interrupt, with a possible rollout. This allows us to conserve storage in multi-user swapping environments if the external program is lengthy, or in any environment if the external routine is huge and therefore the storage used by the travelling program should be vacated in order to satisfactorily perform the external program. In this case, the P-code interrupt is signaled in block 366. The indicated PRE-ROLLOUT routine copies the parameters to the external form the stack (or variables) to temporary storage. The INTER-ROLLOUT routine invokes the EXTERNAL routine and receives any returned result; and the POST-WAIT routine copies the returned result to the stack (if the external routine was invoked as a function).

It is possible that the external routine is actually another travelling program. If so, then special optimization may be performed by using the existing already-loaded image of the P-code interpreter, and simply passing a new set of parameters to block 120 (FIG. 7). In this, special logic would need to be inserted in blocks 262 and 264 to conditionally avoid releasing the interpreter code itself.

Now let us turn out attention to various special built-in functions which are used by the present embodiment. Many of these could be executed either as built-in functions, or as language statements with their own special P-code operation.

Figure 20:
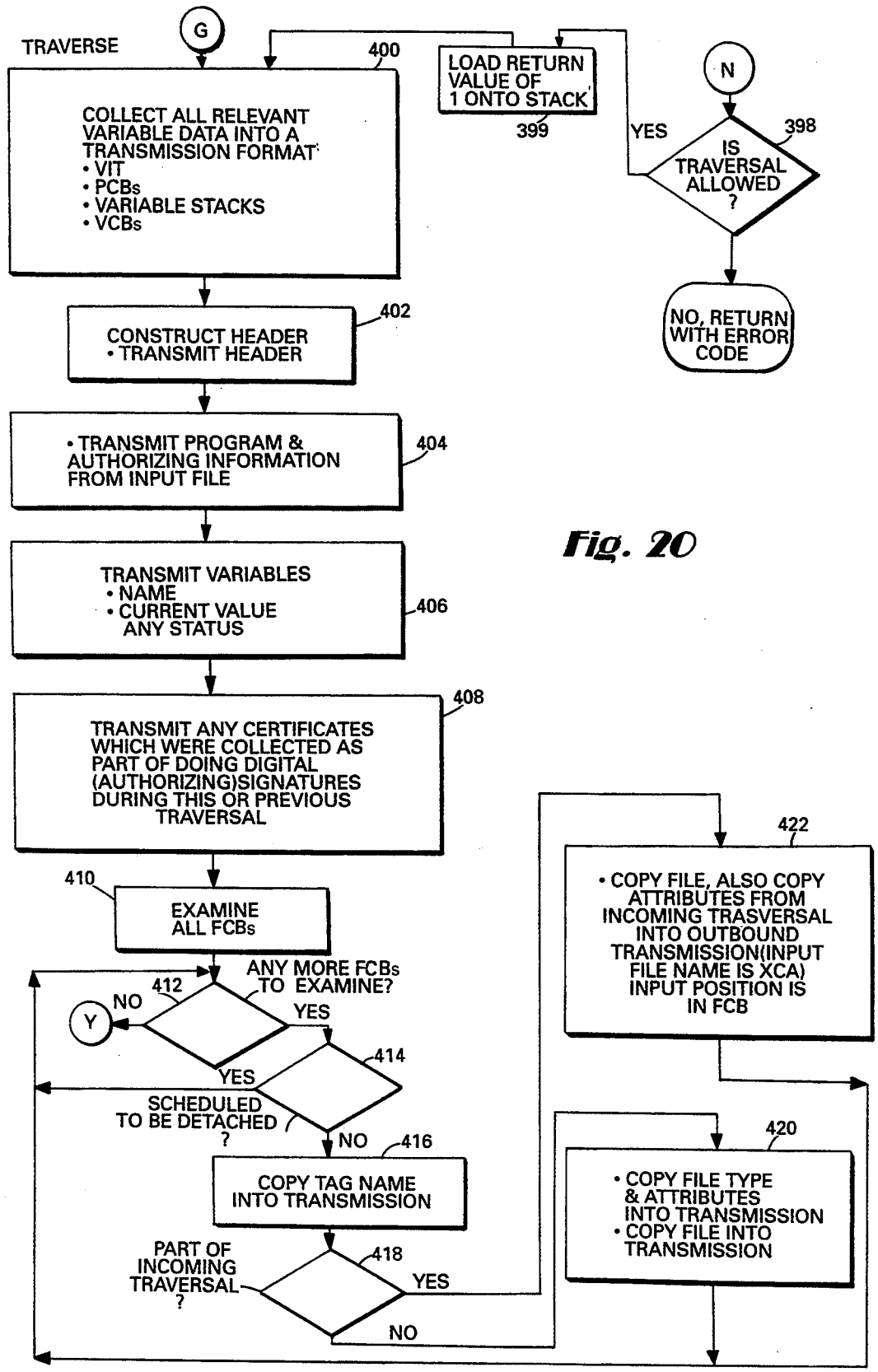
FIGS. 20 and 21 delineate the operations which are performed when a travelling program mails itself to a predetermined recipient.
Figure 21:
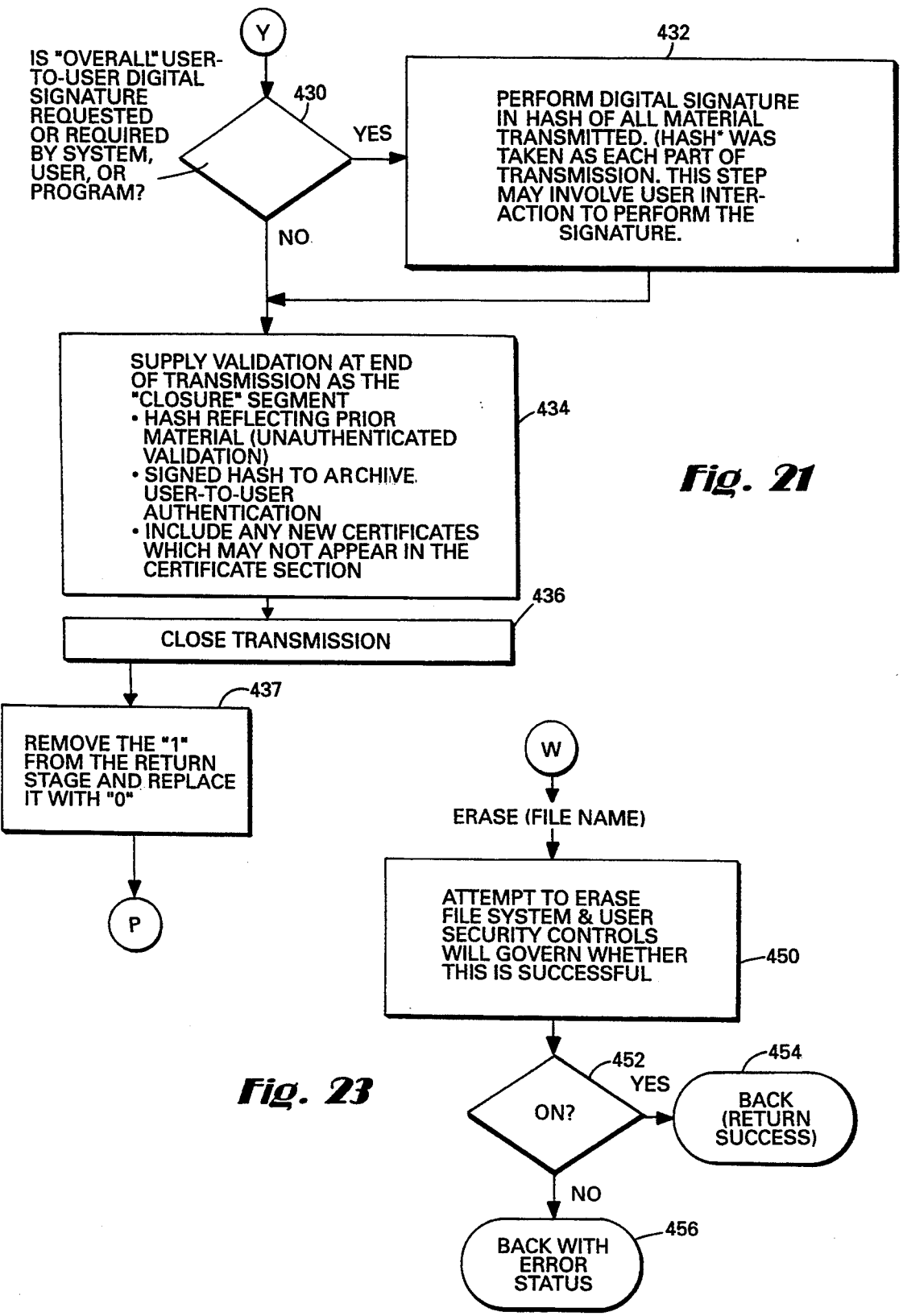

FIGS. 20 and 21 illustrate the operations which are performed when a travelling program transmits itself to a predetermined recipient. In block 398, any program authorizing information is first checked to insure that the traversal operation is permitted. (It is conceivable that some travelling programs may not be permitted to travel—but simply to do some function which terminates at the first use). In the rare case that the program is not allowed to travel, a special return code is presented to the caller.

The present embodiment implements the "TRAVERSE" operation as a built-in function. Furthermore, the function is defined to return "0" to the immediate caller of the function and "1" to the caller after the function is restarted on the recipient's computer. As explained earlier, this difference in return code allows the program to differentiate between the sender's and recipient's computer.

To do this, in block 399, the TRAVERSE function first pre-loads the value "1" on the execution stack, knowing that the stack is transmitted intact. This is the value that will therefore be returned when the travelling program is reconstituted and restarted on the recipient's computer. Then all relevant variable data such as the "variable" information table, process control blocks, the various stacks, variable control blocks are collected into a transmission format such as a format shown in FIG. 2.

As indicated at block 402, the travelling program header is constructed and transmitted. The travelling program is transmitted segment by segment, although it could, in fact, be transmitted in a field by field format, or any other way if desired. Preferably, a hash is taken of each segment as it is transmitted.

Thereafter, in 404, the program and any authorizing information from the input file received with the travelling program is then copied to the output transmission file. The "variables" segment is then transmitted including the name, current value, and relevant status of each variable (406). Any certificates which were collected as part of performing digital (authorizing) signatures during this or previous traversals are then transmitted. Thus, any time a digital signature operation is performed, all the associated certificates are collected and transmitted in the certificate section of the travelling program 408. The signatures are maintained as variables within the program (i.e., within variable control blocks). Certificates in the presently preferred embodiment are treated as material which can be accessed via built in function calls.

Alternatively, it would be possible to include in the certificate package even those certificates which relate to the signatures of the overall transmission and signature(s) which authenticate and authorize the program itself. However, this would require that all the certificates definitely be known at the time the Certificate segment was written, and the logic, and possibly the position of the segments would need to be re-ordered to insure optimized processing.

In our implementation, we prefer to keep the certificates associated with the program's authorizing signature with the program authorization information in the header or program segment, and the certificates for the user-to-user transmission signature authentication with the signature in the closure segment.

After the certificates are transmitted, all file control blocks are examined resulting in the examination of all files which may have been transmitted during prior traversals and any newly attached files 410. A check is then made in block 412 to determine whether there are any more file control blocks to examine. A check is then made at block 414 to determine whether any file being examined was scheduled to be detached 414. If so, the routine branches back to 412 and neither the file, nor the file tag is copied for transmission. If the file is not scheduled to be detached, then the file tag name is copied into the transmission 416.

A check is then made to determine whether the file in question is part of an incoming travelling program which is being carried forward (418). If it is determined that it was part of the incoming traversal, then all file attributes from the incoming traversal as well as the file itself is copied to the outbound transmission file (422). This input file name may be accessed via the execution control area XCA and the input position of the file is associated with the file control block 422.

If the file is not part of an incoming traversal but rather was attached during the travelling program execution, then the file, the file type, and its attributes are copied into the transmission file 420. Thereafter, the routine branches back to block 412 to determine whether there are any more file control blocks to examine until all file control blocks have been examined.

As indicated in FIG. 21, when all FCB's have been examined, a check is made to determine whether an overall user-to-user digital signature has been requested is required by the system program 430. Such an overall signature would be useful in detecting tampering with transmitted information.

If an overall digital signature is to be taken, then a digital signature operation on the hash of all material transmitted is performed (432). The digital signature operation may be performed in accordance with the teachings of U.S. Pat. No. 5,005,200 (or more conventional digital signature techniques which do not have the associated authority verification attributes, as desired). As indicated at block 432, a hash was previously taken for each part of the transmission. It is noted that alternatively, a hash may be taken of each of the hashes. The digital signature step may involve user interaction to perform the signature.

Thereafter, validation is supplied at the end of transmission as the "closure" segment. The validation is supplied by transmitting a hash reflecting prior material. The signed hash should demonstrate user-to-user authentication 434. Any certificate necessary to validate the final signature, which are not already in the certificate segment, should be included in the CLOSURE segment. Thereafter, the transmission is closed 436.

Finally, in block 437, the value "1" which was previously loaded onto the execution stack for the benefit of the transmitted program when it arrives at the recipient, is removed and replaced with the value "0"—which is returned to the current caller to allow it to distinguish itself.

Because creating a digital signature typically involves user interaction—such as possibly selecting a certificate and opening the private key, or asking the user to operate his digital signature token device—the material described in FIG. 20 and 21 will actually operate in the preferred embodiment as P-code interrupt routines. As an example, the TRAVERSE function code would trigger a P-code interrupt, in which the logic from blocks 399 to 430 would operate as a PRE-ROLLOUT routine, while the block at 432 might operate as a INTER-ROLLOUT routine since it may require the aforementioned user interaction. The blocks thereafter (434, etc) would operate as a POST-WAIT routine.

The travelling program can be designed as desired to transmit itself numerous time during its execution to various recipients. In such multiple transmissions, the variables can be changed prior to each transmission as appropriate. In this fashion, the program in the position to do processing distinct for each recipient in a manner which is implementation dependent.

Figure 22:
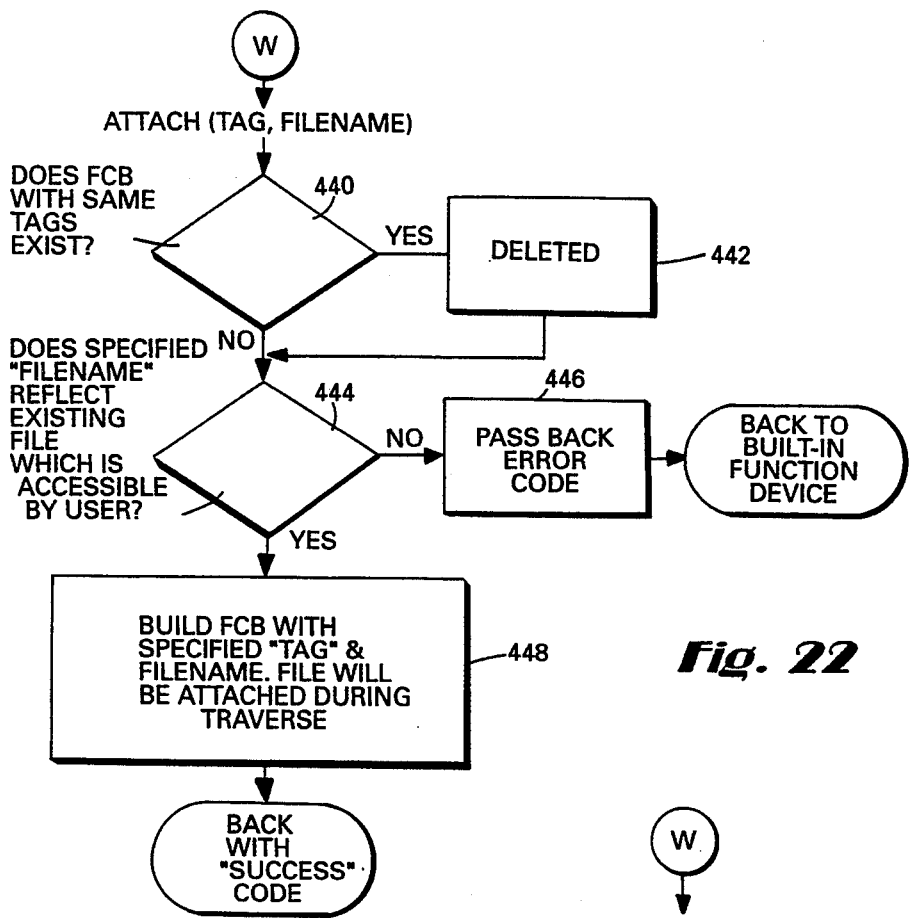
FIG. 22 delineates the sequence of operations for attaching a file to the travelling program.

FIG. 22 illustrates a sequence of operations for attaching a file to the travelling program. The attach file routine responds to an identified file tag and an identified file name. As indicated at block 440, a check is made to determine whether a file control block with the same tag exists. If so, then the previous file with the same tag is deleted 442.

Thereafter, a check is made to determine whether the specified file name reflects an existing file which is accessible by the user. In this regard, the travelling program may be associated with program authorization information which defines the range of operations which the program is able to perform, including the ability to access files. Such program authorization information will be checked to determine whether the file name is accessible. If the file name is not accessible by the user, then an error code/message is returned to the user 446.

If the file name is accessible to the user, then a file control block (FCB) is built with the specified tag and file name and the file will be attached during the next and subsequent transmission of the travelling program 448. The routine is thereafter resumed with an indication that the file has been attached successfully.

FIG. 23 illustrates how a file is erased from the user system. When an "erase" function is attempted to be executed, security codes are checked to determine whether the program is authorized to perform such an operation (450). If the security codes indicate that the program is authorized to erase the specified file (452), then an erase operation is performed and the routine branches back with an indication whether the file was successfully erased 454. Alternatively, if the program is not authorized to perform an erase operation, then the calling routine is returned with an error message indicating that the file could not be erased (456).

Figure 24:
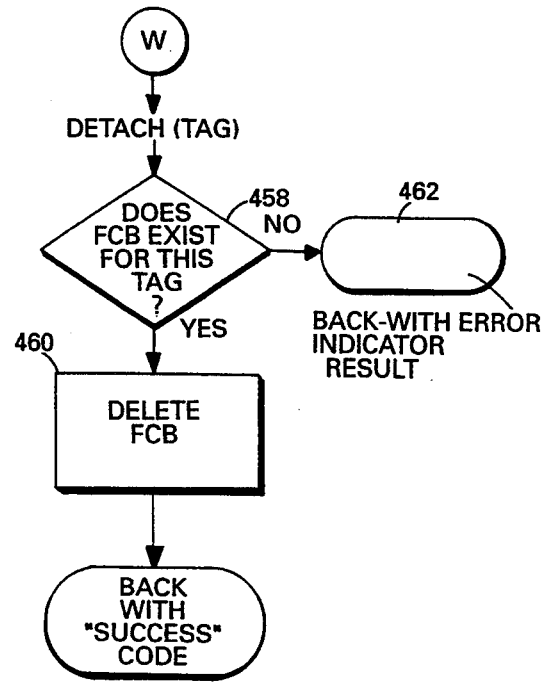
FIG. 24 shows the sequence of operations performed in detaching a file from a travelling program.

FIG. 24 illustrates the sequence of operations performed in detaching a file from a travelling program. As indicated in block 458, a check is made to determine whether a file control block exists for the identified tag associated with the file to be detached. If no FCB exists, then the main routine is returned to with an error message indicating that the file could not be detached 462. If the file control block does exist as determined at 458, then the file control block is deleted at 460 and the main routine is returned to with an indication that the file has been successfully detached.

Figure 25:
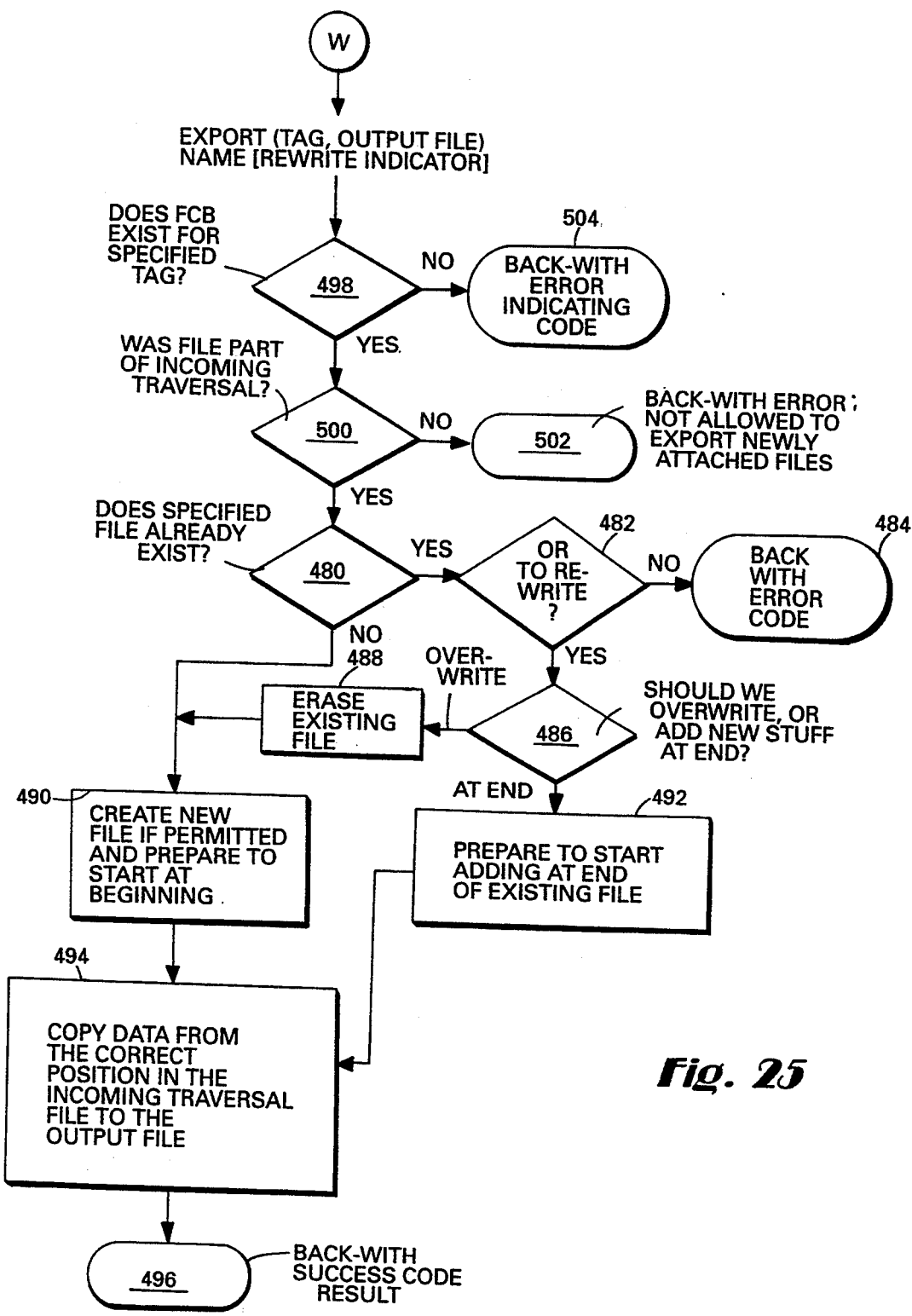
FIG. 25 delineates the sequence of operations performed when a file has been transformed into a user file.

FIG. 25 delineates the sequence of operations performed when a file is to be "exported", i.e., transformed into a user file. A travelling program may take a specified file, for example, representing a spreadsheet and convert such a file to a recipient user's file that remains with the user even after the travelling program has been sent to a further destination. The file to be "exported" will be identified by a tag and an output file name and, if desired, a rewrite indicator identifying whether the file may be rewritten.

A check is initially made as to whether a file control block exists for the specified tag 498. If no FCB exists, then an appropriate error indicating code is generated and the calling routine is returned to (504). If a FCB does exist with the specified tag, a check is made to determine whether the file is part of an incoming travelling program 500. If the file to be exported was not part of an incoming traversal, then it must have been attached by the user and already be present in the user's file and, accordingly an error message is generated indicating that one is not allowed to export a newly attached file 502. If the file was part of the incoming traversal, then a check is made to determine whether the specified file already exists (480). If so, then a check is made at block 482 to determine whether it is okay to rewrite the specified file. The check includes determining whether the program is allowed to modify the specified existing file (if no "overwriting"), or to erase and create the specified file (if "overwriting" is permitted). If not, then the block 484 is used to return an access error to the program. If the check at 482 indicates that it is okay to rewrite, a determination is made as to whether the file should be overwritten or whether new material should be added to the end of the file (486). If overwriting is indicated at 486, then the existing file is erased (488). A new file is created, if permitted by program authorizing security information and preparations are made to start writing at the beginning of the file (490).

If overwriting is not indicated at 486, but new material data is to be added at the end, then preparations to start adding at the end of the existing file are made, as indicated at block 492. Thereafter, the data is copied from the correct position at the incoming traversal file to the output file (494) and the main routine is re-entered with an indication that the exporting operation has been successfully performed (496).

FIG. 26 illustrates an exemplary sequence of operation performed when material is to be digitally signed. In implementing the digital signature function, initially a check is made to determine whether a digital signing operation is permitted by the program as indicated at block 510. Whether a program is permitted to perform a digital signature operation will be controlled by program authorization information which is associated with the program and which is monitored every time the program is executed to ensure that unauthorized operations are not performed. If the digital signature operation is not permitted, then an error message will be generated rejecting the digital signature function call 511.

If the digital signature operation is permitted, then in block 514, the SIGN function prepares for user interaction by moving an image of the data to be signed, together with any parameters (such as any required authorization for the data content) to temporary storage in preparation for receipt by the INTER-ROLLOUT routine (shown in FIG. 27) which will perform the user interactions associated with performing the actual signature.

In block 512, the P-code routine is signalled, with interrupt routines which are described below.

If the digital signature authorization is authorized, then a display panel must be presented to the user to solicit which certificate is to be used for the signature operation. The signature operation is preferably performed in accordance with the inventor's U.S. Pat. No. 5,005,200 which patent has been expressly incorporated herein by reference. The user may possess a wide range of certificates for performing digital signature operations including those constructed along the lines of U.S. Pat. No. 5,005,200. The INTER-ROLLOUT routine is given control at block 509 after much of the storage is rolled out (the signature routine itself must remain in storage, of course).

If there are no certificates suitable for performing the signature, then control passes to block 515 which generates an error indicator to be returned to the sign operation. If there is only one certificate suitable for performing the signature, then it is automatically passed to (513). If there are more than one suitable certificates, then the user is asked to select (516). If the user declines (517), then this an appropriate error indicator is generated, and passed to the program (515). Otherwise, the chosen suitable certificate is passed to (513).

The associated private key is then located (513). If block 518 determines that it is located on the user's token, then step (524) is used to solicit communication to the token so that it can perform the digital signature. Otherwise, the user's private key is located in the system encrypted under a secret password phrase. The user is solicited (520) for this password, which is used to decrypt the private key. Any errors or bad passwords are detected, an appropriate error message is generated. To inhibit guessing by someone other than the true user, only a limited number of tries to give the correct password are allowed.

In block 522, the password is used to decrypt the private key, which in turn is used to sign the message, according to the necessary authority. After the operation, all traces of the secret material is erased, and the signature and certificate are returned to (268, FIG. 15) in temporary storage. In (270) control is then given to the POST-WAIT routine (530) which moves the signature from temporary storage to the execution stack.

In block 532, the operation is checked, and if it was successful, the proof hierarchy for the signer's certificate is obtained. Certificates are added to the overall certificate collection (maintained in the XCA (90, et al)) if they do not already appear.

Figure 28:
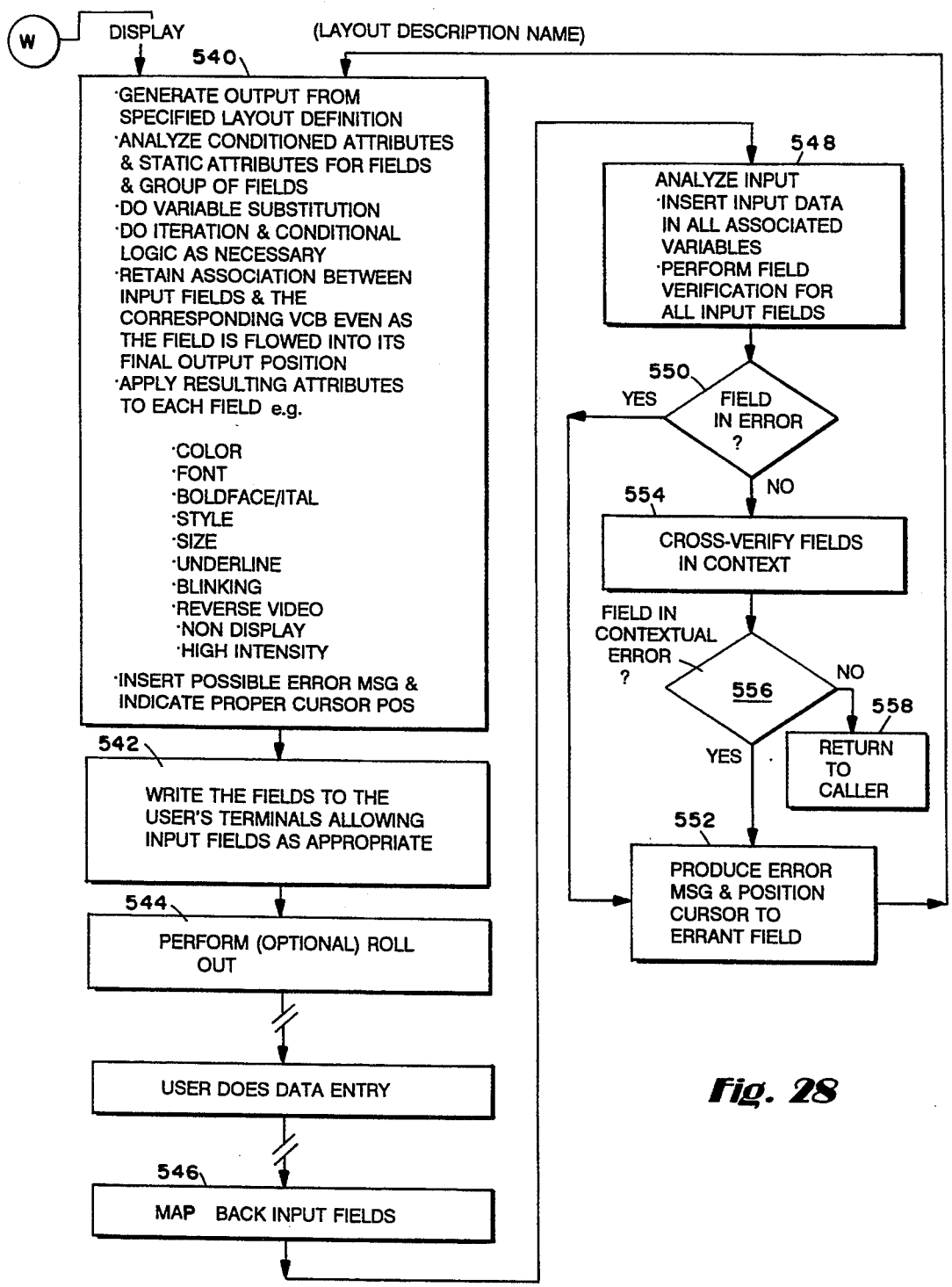
FIG. 28 shows the sequence of operations performed when displaying information to the user.

FIG. 28 illustrates the sequence of operations performed when displaying information to the user. The travelling program has associated therewith a display layout capability which is described in conjunction with FIG. 28. The layout capabilities of the travelling program adapt functions heretofore associated with typesetting applications for use in a user interactive display mode together with additional enhanced capabilities.

The screen may be laid out such that input fields can be readily moved and associated with various attributes for very flexibly interacting with the user. Various display related operations and functions are summarized in block 540. The display presents an output based on a specified layout definition process controlled by the display processing portion of the interpreter.

The display processing involves analyzing conditional attributes and static attributes for the fields and the group of fields in the layout definition. In the display processing subroutine, variable substitution and iteration using conditional logic is performed as necessary. Although variable substitution is permitted, the system retains association between an input variable and where the field is to be displayed on the screen in the corresponding variable control block (VCB) even if the field is flowed into its final output position as dictated by the layout definition.

The following attributes are then provided to each field including, color, font, boldface/italics, style, size, underlining, blinking, reverse video, non-display (e.g., for hiding passwords), high intensity display, etc. Additionally, possible error messages are inserted where appropriate for a detected error condition and the proper cursor position is indicated.

The layout language used in block 540 permits not only the definition of a screen output but also definitions for accepting input. As indicated in block 542, fields are written to the user's terminal allowing input fields, as appropriate depending upon the application. As previously described, data structures may be rolled out to auxiliary storage (544) and rolled back (546) after the user performs data entry into the appropriate input fields.

To do this, the step 544 actually involves signaling a P-code interrupt, and having the block 545 executed as the associated INTER-ROLLOUT routine, and block 546 executed as the POST-WAIT routine responsible for mapping the input fields back to the VCBs for the associated variables. This may involve passing data through temporary storage.

Thereafter, the input is analyzed and the input data is inserted in all associated variables. A field validation is then performed for all input fields 548. Thus, a check may be made to make sure that for numeric fields only numbers have been entered. Similarly, a check may be made to determine whether an input field has the specified attributes.

Thereafter, a check is made at block 550 to determine whether there has been an error in any field. If there has been an error, then an error message is produced and the cursor is positioned to the errant field (552), after which the routine branches back to 540 to generate an error message display.

If the check at 550 fails to reveal an error in a particular field, then a further check is performed to cross verify that the fields are correct in context (e.g., although two adjacent fields may be correct individually, an error condition may be defined regarding the combination of fields) 554. Based on a cross verification, a determination is made as to whether the field contains an contextual error. If not, then a return is made to the caller 558. If there is a contextual error then an error, message is produced in accordance with block 552.

It should be noted that verification of both the individual fields is completely under control of the program. There may be various specifications, utility routines and other conveniences to simplifying handling common situations, but in general, any possible validation is possible. Cross-validation of fields may involve more semantic concerns, and is thus more likely to require specialized programming.

Figure 29:
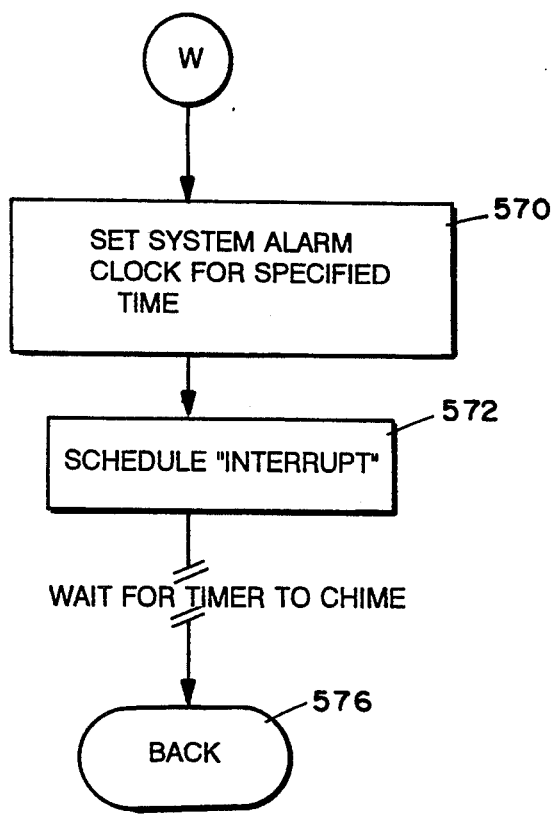
FIG. 29 delineates the sequence of operation performed by the "time delay" routine.

FIG. 29 delineates a sequence of operation performed by a time delay routine. The time delay function may be utilized to wake up at predetermined time intervals and check to see whether any incoming electronic mail has arrived and attach itself to that mail to thereby efficiently handle incoming electronic data interchange. Thus, though such a time delay mechanism, a travelling program could examine a particular mail box at predetermined time intervals to check whether any mail has arrived. If the mail has arrived, the travelling program could send the mail to a destination to be handled by a further recipient. Alternatively, the travelling program could examine incoming data (such as mail), and based on various content indicators, automatically perform a traverse and spawn a new "instance" of itself which could treat the mail appropriately. Of course, the original "instance" could continue executing and process every instance that arrives.

For example, if the incoming information happened to be EDI transactions, then a travelling program could read the information (using, for example, a READ built-in function), break it apart into internal variables, determine by whom it should be processed, and perform the appropriate traversal. Once successfully routed, the letter could be disposed, moved or archived, the program could clear its variables, and resume looking for more input.

Alternatively, after determining the type of material arrived, it could invoke another program to process the incoming data. If the other program happened to be a travelling program, then that program could be given the necessary input information, and could then TRAVERSE itself appropriate to the handling.

This would allow, for example, one travelling program to act as a automatic router for incoming data, such as EDI transactions, and then hand off to other travelling programs the transactions which it is not prepared to handle itself.

Furthermore, if the EDI were signed, then the travelling program could verify the signature immediately. If the signature were valid, and especially if it were done according to U.S. Pat. No. 5,005,200, then the authorization for the content could be programmatically screened, and the travelling program could automatically spin-off an instance to handle the incoming transaction.

For example, with proper enhanced authorization, an incoming Purchase Order could be automatically and instantly routed to the shipping department to commence filling.

Items which arrived which were not signed, or which used simple signatures rather than authorizing signatures, could be routed to various clerical persons for exception processing and more detailed inspection.

As indicated in block 570, the time delay routine, sets the system alarm clock for a specified time. Thereafter, an optional roll out of data to auxiliary storage may be performed (572) by scheduling a P-code interrupt with appropriate routines followed by a performance of a roll-in of data after the specified time period has elapsed. Thereafter, a return to the calling routine occurs (576).

Figure 30:
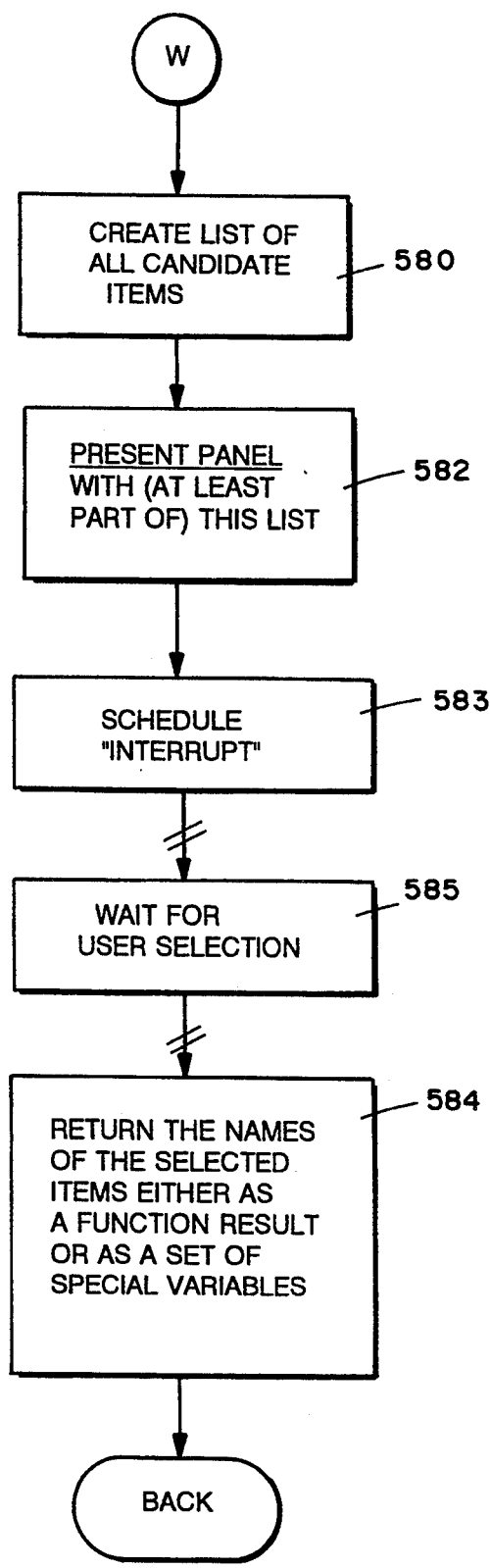
FIG. 30 shows the sequence of operations for a "select from directory" function.

FIG. 30 which shows the sequence of operations for a "select from directory" function. The directory could be a directory of files or a directory of user's, etc. Initially, a list is created of all candidate items 580. Thereafter, a display is generated to display at least part of the list 582. The user will have an opportunity to select among those items presented (583, 585), after which the function will return the names of the selected items, either as a function result or a set of special variables (584).

Again, as described elsewhere, the actual WAIT is performed through the use of the P-code interrupt function. In this case the INTER-ROLLOUT routine waits for the user to select from the selection, and returns the input to the program variables through the POST-WAIT routine.

FIG. 31 is a routine which demonstrates how the interpreter program permits a user to perform digital signatures. As indicated at block 600, the data to be digitally signed is assembled based on data which the program is able to access: this includes user supplied input, data read from files, data accumulated from previous traversals, data based on the user's environment (e.g., the user's TSO identifier), the time, data incorporated into the program itself, and data derived from built-in functions (such as the built-in X12 data dictionary). Appropriate information is displayed to the user (602). The user then decides whether or she wishes to sign the data, as indicated at block 604. If the user indicates he wishes to perform the signature, the system invokes the sign function, as illustrated in FIG. 26, to further interact with the user and complete the signature (606). Thereafter, the digital signature is generated and saved as a program variable 608.

FIG. 31 and the flowcharts which follow depict, in part, how a user might utilize the travelling program methodology described therein, while performing relatively few operations to accomplish powerful functions built into the aforedescribed interpreter.

FIG. 32 exemplifies how a user would verify received information. As indicated in block 610, the data which is expected to be verified are assembled. Thereafter, a "verify" function with the assembled data and the saved digital signature, together with any possible authority requirements is invoked. The verification function may be accomplished as described in U.S. Pat. No. 5,005,200 or using standard digital signature techniques if a conventional digital signature operation was utilized to sign the variables. Thereafter, a determination is made based on the processing in block circuit 12 as to whether the signature is verified (614). If so, then the program execution continues. If not, an error condition results indicating that the data has been tampered with or that there has been some kind of programming error 616. Return codes are defined to allow the program to distinguish whether the signature was invalid, whether it supported authorization capability, and if so, whether the authorization was confirmed.

Figure 33:
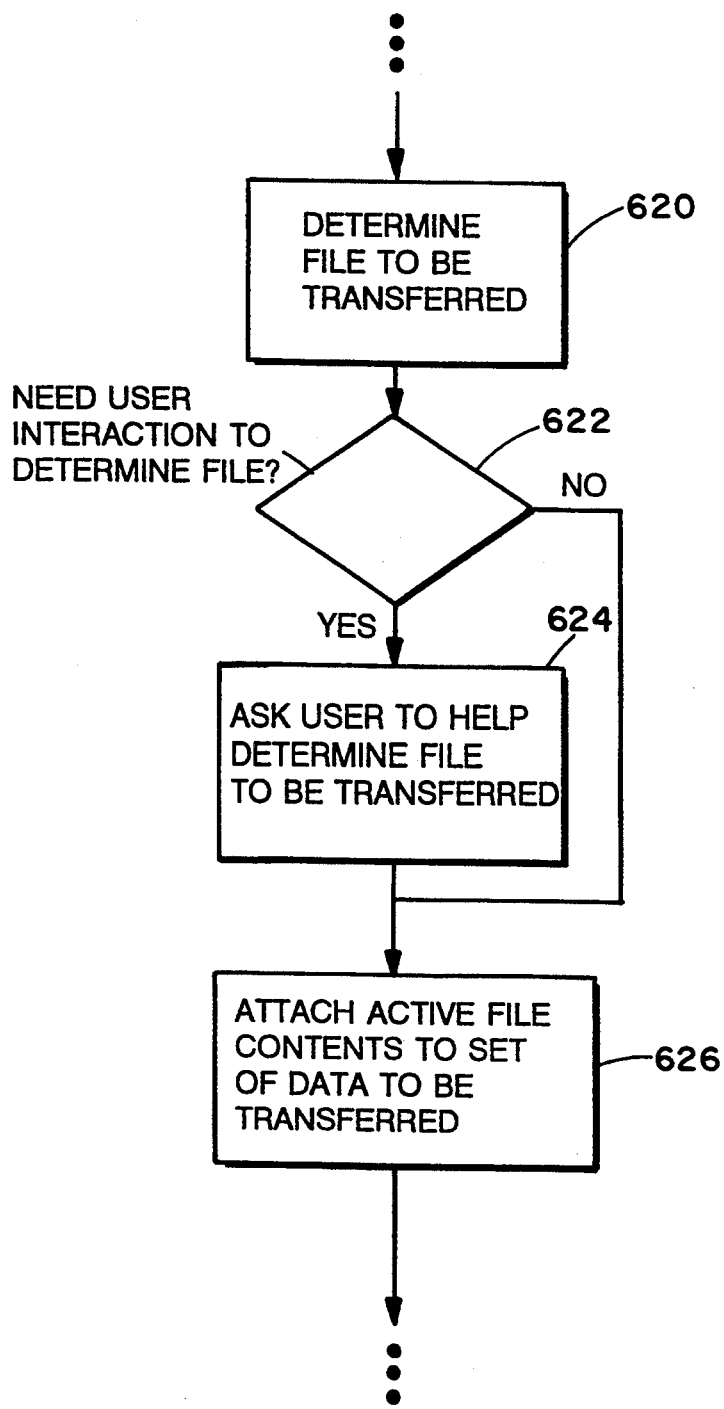
FIG. 33 illustrates how a travelling program collects a file to be transferred.

FIG. 33 illustrates how a travelling program collects a file to be transferred. Initially, the program determines the file to be transferred by, for example, displaying to the user, a list of files 620. A check may be made to determine whether it is necessary to have user interaction in order to determine the file (622). If yes, then the user is prompted to determine the file to be transferred 624. If it is not necessary to have user interaction to determine the file, then the entire file contents are attached to the set of data to be transferred 626. The operation is accomplished using the attached functions set forth in FIG. 22 which involves building a file control block as previously described.

Figure 34:
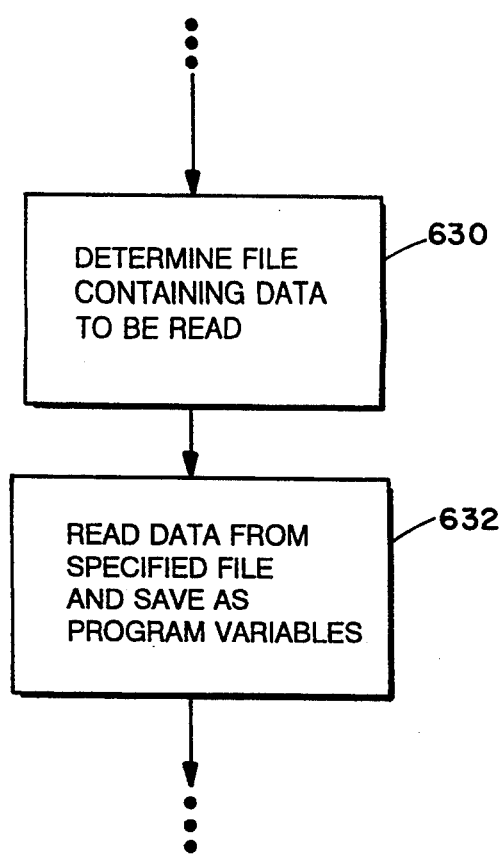
FIG. 34 illustrates the travelling program operations performed in reading data from a specified file.
Figure 35:
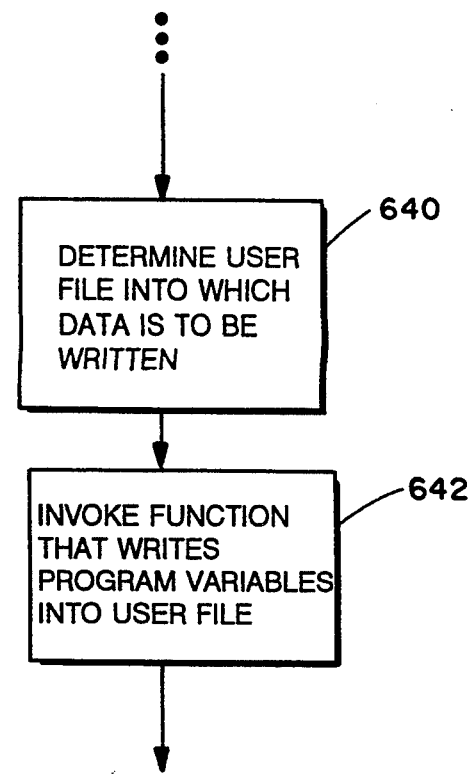
FIG. 35 illustrates how the travelling program may update or create a file from program variables.

FIG. 34 illustrates the travelling program operations performed in reading data from a specified file. Initially the file is determined containing the data to be read (630). Thereafter, data is read from the specified file and saved as program variables 632. FIG. 35 illustrates how the travelling program may update or create a file from program variables. As indicated in block 640, the user file into which data is to be written is first determined. Thereafter, a function is invoked that writes program variables into the user file 642.

It should be understood, even if not explicitly described in every case, that any program function which could lead to data loss, alteration, damage or disclosure is subject to security controls. Such controls can be applied at the program level, and either be tied to the incoming program and possibly by combined in some predetermined fashion with those also imposed by the user.

Therefore, for example, in the above case, the travelling program could only read or write user's data files if the program were so authorized.

Security constraints exist for at least the following classes of functions:
Display data to the user.
Soliciting input from the user.
Performing digital signatures.
Reading data from user files.
Creating user files.
Erasing user files.
Writing data into user files.
Remaining user files.
Attaching user files.
Exporting attached files into user files.
Invoking an digital notary device.
Receiving incoming electronic mail
Reading the contents of electronic mail
Moving or archiving incoming mail
Deleting incoming mail.
Generating outbound electronic mail, or doing various types of data transmissions
Being coupled to various types of equipment, device and services (FAX, printers, office equipment, robot devices, manufacturing equipment, etc.)
Performing a program traversal.
Invoking external programs.
Accessing, updating, activating, erasing, altering, invoking, or attaching other travelling programs FIG. 36 is illustrates how a travelling program may be designed to be split and sent to a number of different recipients and FIG. 37 demonstrates how the previously split programs may be merged.

Figure 36:
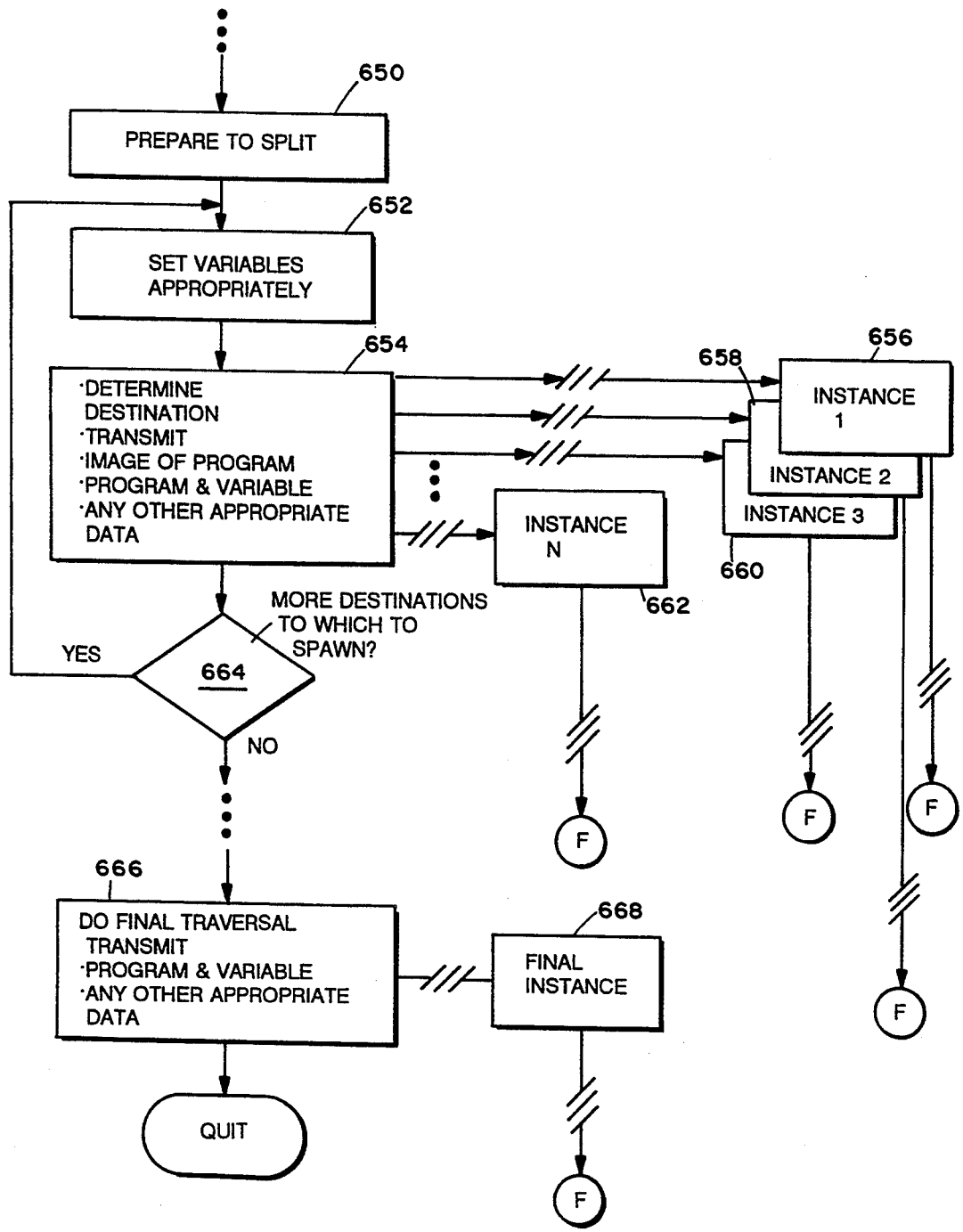
FIG. 36 illustrates how a travelling program may be designed to be split and send programs to a number of different recipients.

Turning first to FIG. 36, the travelling program may need to be split in order, for example, to acquire survey data from a number of different recipients or to collect or distribute data to a number of different executives in an organization. Initially, the travelling program performs various housekeeping operations to prepare to split 650. Thereafter, variables are set in accordance with particular application requirements, e.g., the survey run by a particular user 652. Destination users are then determined and the traverse function is invoked as per FIGS. 20 and 21 to transmit the image of the programs, the programs variables together with any other appropriate data tailored to the individual recipients 654. The transmitted variables may change from instance 1 (656) to instance 2 (658), instance 3 (660), to instance N (662).

A check is ultimately made to determine whether there are more destinations to which to transmit (664). If so, then the routine branches back to 652 to transmit to the further destination. If there are no further destinations, then the final transfer is performed 666 in the same manner as explained above with respect to 654 to result in the final "instance" 668, thereafter resulting in the completion of the splitting operation.

In other examples, it may also be that the master program simply goes into some other processing. Perhaps, if it were running in a batch environment as an input distributor, and all the input were presently exhausted (having just been spun off to a number of users), it would go into a delay until something else arrived.

Figure 37:
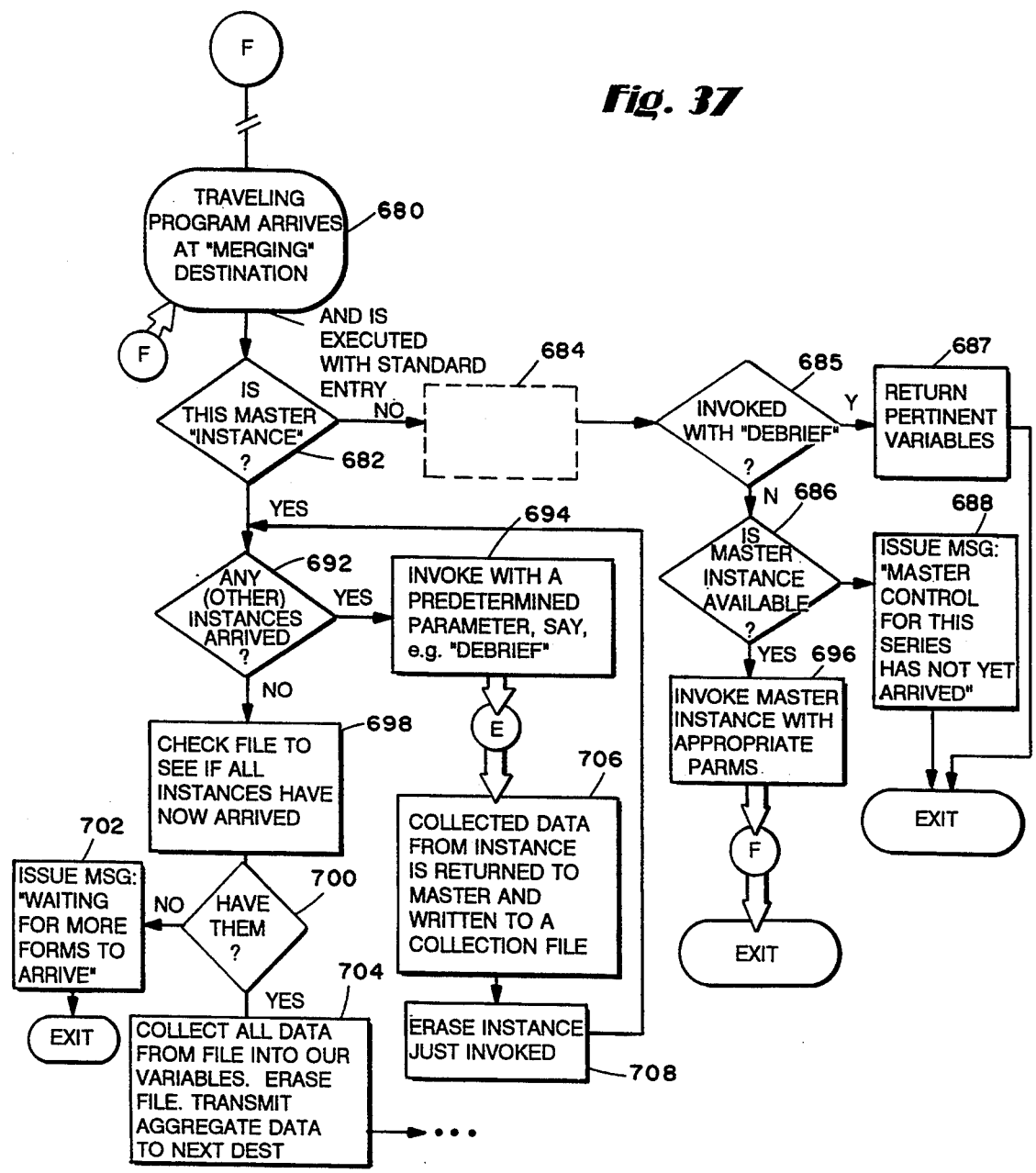
FIG. 37 demonstrates how previously split programs may be merged.

Turning to the FIG. 37 merge operation, the travelling program has the intelligence to transfer itself from user to user to merge further data until the merging operation is complete. Initially, the travelling program arrives at a merging destination and is executed (680). A check is made to determine whether this is a master "instance" which is determined by a predetermined variable being set. If it is determined that this is not a master instance at 682, a slave instance is identified 684. At (685) the slave program checks if it has been invoked with the special "DEBRIEF" parameter (which is simply a convention used by this program to determine when the slave is being called by the master), and if so (687) passes back all pertinent information to the master instance, then exits. If this is not the DEBRIEF invocation, then a check is made to determine whether the master instance is available, i.e., has already arrived, 686. If the master instance is available then a call is made to the master instance 696, through the use of the call shown in FIG. 18. After the master instance has been invoked, the routine branches back to block 680. If the master is not available, a message is issued that the master control for the series has not arrived 688.

Presuming the master instance has arrived and has been invoked, then at block 682 a determination is made that this is the master instance and a check will be made to determine whether any other slave instances have arrived 692. If so, then the slave instance will be invoked with a predetermined parameter to initiate the collection of data (referred to perhaps as "debriefing") 694. At entry point E, data is collected from the instance and is returned to the master and is written to a collection file 706. Thereafter, the instance that has just been invoked is erased 708 and the routine branches back to 692 in which case further information is collected if other instances have arrived.

If no further instances have arrived the file is checked to see if all instances have all arrived (698). If they have, as determined at 700, then the data could be read from the collection into variables in the travelling program. Depending on the expected size of the collection file, and the nature of the processing, it might be more desirable for the master program to process the completed file at that moment and either traverse itself to the next destination, or to encapsulate the result into a simple message, perhaps even an EDI transaction and simply transmit that raw data.

In other cases it might be appropriate for the program to ATTACH the file to itself and transfer it wholesale to another process. The file is erased and aggregate data is transmitted to the next destination 704. If all instances have not yet arrived, then a message is issued such as "waiting for forms to arrive" (702) and the routine is temporarily existed.

Figure 38:
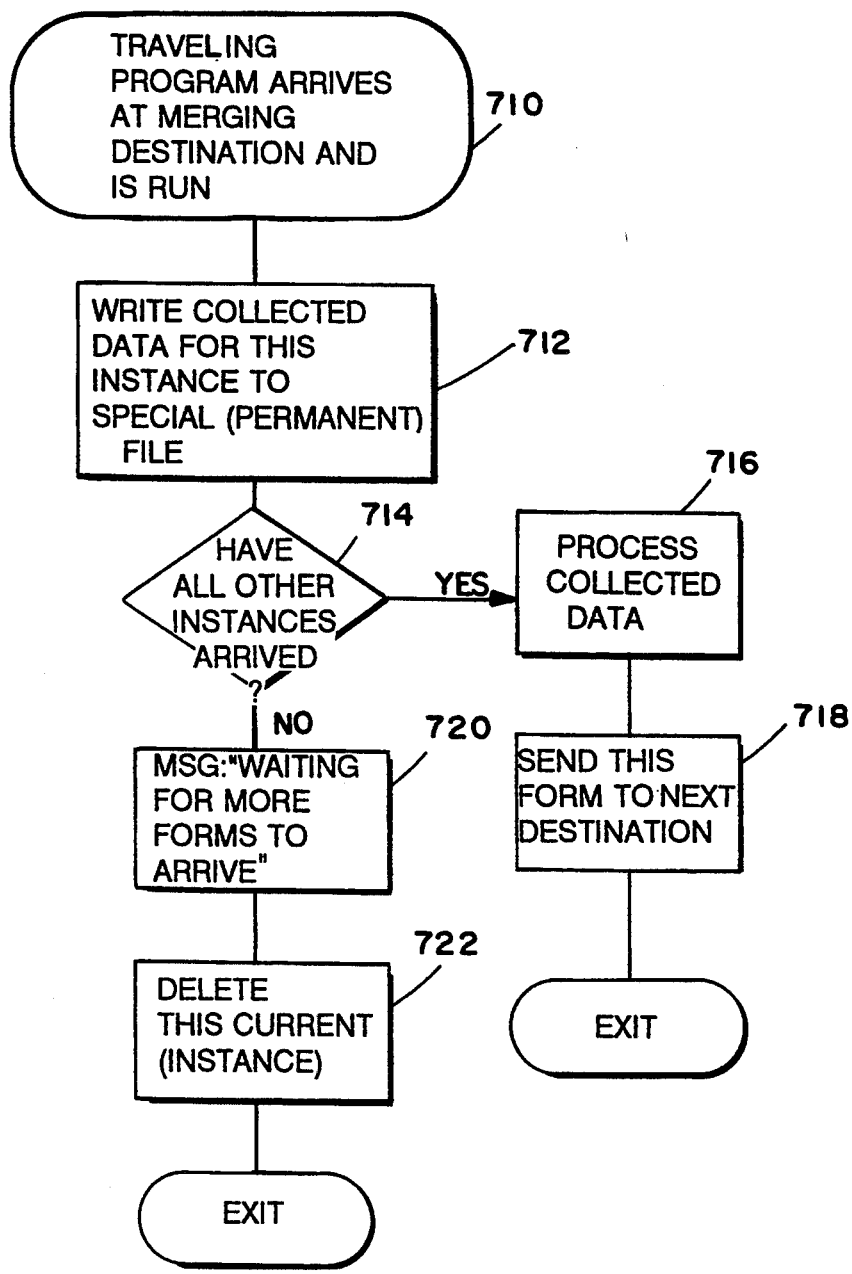
FIG. 38 shows an alternative approach to merging previously split travelling program information.

FIG. 38 shows an alternative approach to merging previously split travelling program information. As shown in block 710, the travelling program arrives at a merging destination and is run. The collected data is then written to a special file 712. A check is made to determine whether all other instances have arrived as indicated at 714. If so, then the collected data is processed 716, and the program traverses to the next destination 718 and the routine is exited. If all other instances have not arrived as determined at 714, then a message is displayed such as "waiting for more forms to arrive" (720) and the current instance is deleted 722, and the routine is exited.

Figure 39:
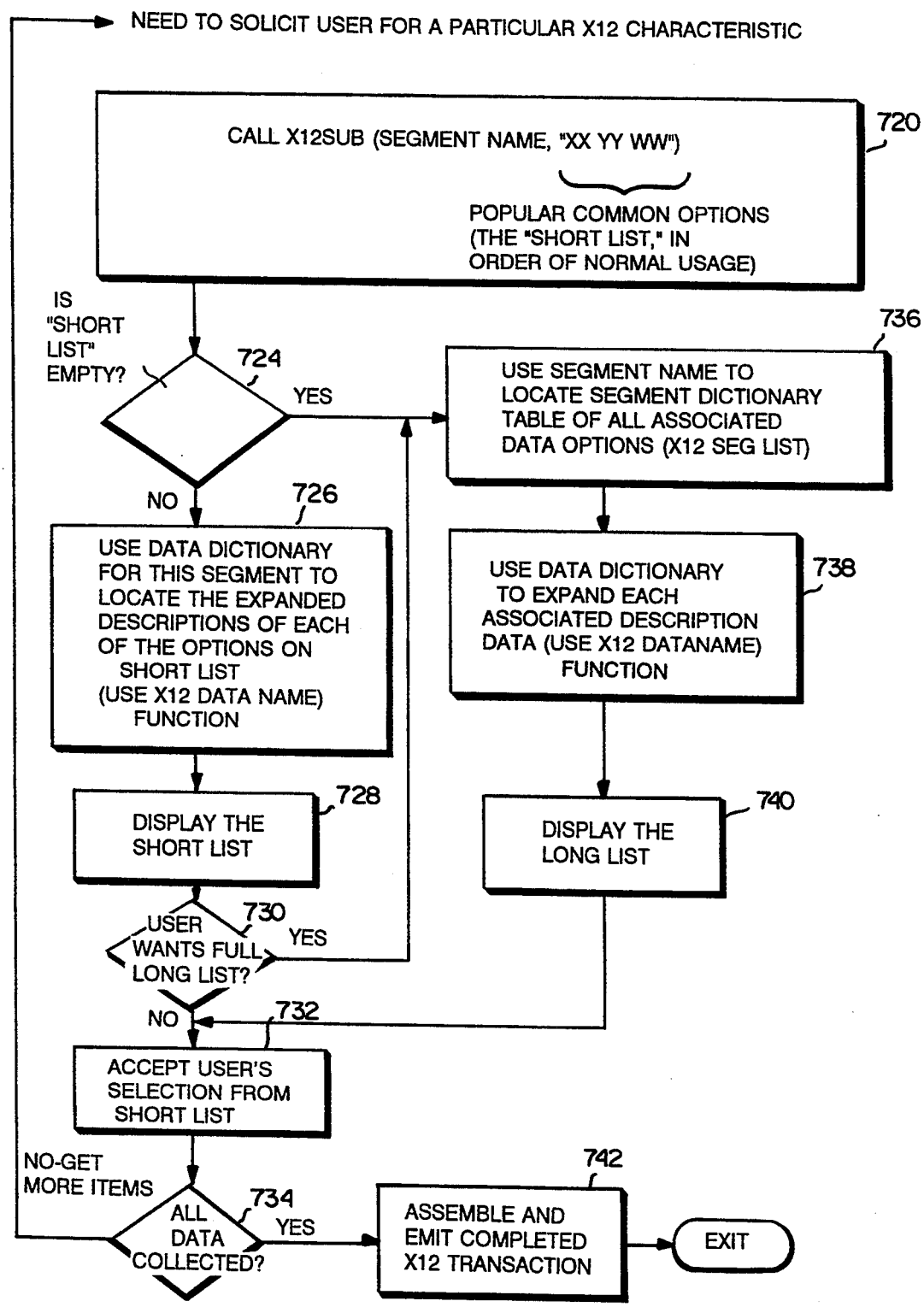
FIG. 39 is a flowchart indicating how the travelling program has been designed to accommodate electronic document interchange generation functions.

FIG. 39 is a flowchart indicating how the travelling program has been designed to accommodate electronic data interchange (EDI) generation functions. FIG. 39 more specifically demonstrates how a particular "X12" standard characteristic may be used. The X12 standard has an associated data dictionary and segment dictionary. The X12 segment dictionary, for example, may be used to define all segments necessary to define a purchase order. Each segment is defined as being a piece of data which is then looked up in a dictionary. Because there are many different ways to specify the quantity of an item, many variations of data are permitted in X12.

The present system embeds the X12 data dictionary into the interpreter which may be called as a built-in function. As indicated in block 720, initially a call is made to the X12 subroutine by specifying a segment name and items "XX, YY, WW, ...". The program can provide X12 data code for popular common options typical in the organization's environment, so as to build a short list of options in order of normal usage. Examples of such items are, in a purchase order context, item number, part number and quantity. This call will result in a call to the built in data dictionary.

A check is made to determine whether the short list is empty (as indicated in 724). If so, the segment name is used to call the built-in function X12SEGLIST that locates the segment dictionary table of all associated data options 736. Thereafter, X12DATANAME built-in function would be used to expand the data dictionary each associated description data 738 and the long complete list would be displayed 740.

If the check at 724 indicates that there is a short list, the X12DATANAME data dictionary is used to locate the expanded description of each of the options on the short list. Thereafter, the short list is displayed 728. Then a check is made to determine whether the user wants the full long list as indicated at 730. If the answer is yes, then block 736 is executed as described above. If no, then the user's selection from either the short list or the long list is accepted (732).

A check is then made at block 734 to determine whether all data is collected. If so, we assemble and emit the completed X12 transaction 742 and then exit the routine. With respect to the emitting operation referred to in conjunction with 742, the present invention contemplates the capability of mailing specific sets of X12 data in addition to mailing the entire travelling program. If all data is not collected as indicated by the check in 734, then more data items are retrieved and the routine execution is repeated.

FIG. 40 relates to the use of the travelling program in receiving an electronic data interchange transaction. For example, a particular user may have received a travelling program generated purchase order. Initially, the received EDI transaction is read 750. Perhaps by a timer-delay travelling program, as described with FIG. 29, which spawns copies of itself as input arrives. The encoded EDI is then parsed into program variables 752. The received EDI is then moved to an archive repository to preserve that which has been received for possible audit. The segments are then processed via a coupled segment dictionary 756. The segment rules associated with X12 are enforced which, for example, may relate to not having certain kinds of data in particular fields, 758. For each data item, the data dictionary associated with each segment is located 760. For a statement such as shown in 762 where DESC=X-12DATANAME (SEGCODE, DATA ITEM), this statement will result in a call to the data dictionary to get a meaningful description of the data item. The retrieved meaningful description will be placed into a display variable resulting in, for example, a display of the purchase order in a purchase order format. All data items are processed by branching back to block 762 and all segments are processed branching back to 756.

The preferred embodiment also allows access to a Digital Notary facility by providing built-in functions which can access a digital notary, or notary device such as described in inventor's U.S. Pat. No. 5,001,752 (which is incorporated herein by reference), or other devices as well.

By allowing a travelling program to access such a facility, the travelling program is able to move data to a platform where the digital notary can be easily accessed, then using the built-in function to do so. This allows notarization for important signatures, timestamps for inbound traffic, or for any other reason. Since such notarization is strictly under control of the program, any criteria whatever, whether automatic or based on user requests, can be used.

Also as described earlier, the facility allows for the coupling to outbound FAX so that electronic forms, in addition to being converted to EDI, or printed, can also be faxed to the ultimate recipient.

Also, as implied, but not explicitly stated, even when a travelling program emits an EDI transaction, it may still be activated later. One example would be a travelling program which first serves as an electronic requisition then, after sufficient approving signatures, generates a purchase order. It could then send itself to a repository where it could later be reactivated when the corresponding invoice and bills eventually arrive (electronic or otherwise) and can serve as a method for reconciling the order with the shipment received and the billing. It can incorporate logic which to keep track of which items have been received, and which are still pending. Because of the ability to flexibly direct itself, it can span many different sites. Insofar as handling shipping and receiving, it is also possible to couple the travelling program with a bar code reader and validate materials sent and received without human data entry.

The preferred embodiment envisions that the travelling program could be coupled to a variety of equipment, including office equipment, and other devices and facilitates.

Also, any given traversal could also be sent simultaneously to a variety of recipients.

The following listing reiterates and summarizes many of the above-described functions (and identifies some additional functions) which the preferred embodiment is capable of performing. This list is only illustrative and is not intended to be exhaustive of the many other applications to which the present invention may be advantageously applied.

Displaying data to the user using a layout language (similar to, e.g., TxX, or SCRIPT), Soliciting input from the user using a layout-type language (similar to, e.g., TeX, or SCRIPT).

Performing digital signatures for data computed under program control.

Verifying digital signatures based on data computer under program control.

Handling co-signatures, possibly including routing suggestions derived from the signer's certificates.

Reading data from user files,

Creating user files,

Erasing user files

Writing data into user files

Renaming user files

Receiving incoming electronic mail

Reading the contents of electronic mail

Moving or archiving incoming mail

Deleting incoming mail

Generating outbound electronic mail.

Coupling to and controlling an outbound FAX server

Coupling to and controlling a printer.

Generating a graphical image.

Coupling to and controlling a device that can receive and transmit audio signals Accessing various types of equipment, including office equipment, computer equipment (tapes, disks, etc.) robot devices, manufacturing equipment, etc.

Splitting an instance of the travelling program into several instances by virtue of multiple traversals.

Being able to re-combine the data contained in the several travelling programs, possibly not even reflecting the same program, into a single form.

Erasing other instances of travelling programs.

Invoking external programs.

Invoking other travelling programs as subroutines.

Activating other travelling programs as independently executing functions.

Extracting data from a dormant (non-executing) travelling program.

Determining information about another (non-executing) travelling program without have to execute it—such as name of the program, and other status, etc.

Extracting information from the certificates associated with digital signatures. This information being used to help direct routing if cosignature requirements are involved.

Making a copy of a travelling program as a data variable within another program, or ATTACHing a travelling program as a file to another.

Using one travelling program (the "carrier") to transport a new version of another to various destinations, and replacing the program segment of existing instances with another, more up-to-date version of the program. One way to do this would be for the newer program segment to be added to the end of existing travelling programs. Enhancements to the existing interpreter/loader would recognize that a program segment following the closure segment reflected a suggested program revision. After whatever normal transmission was performed, it would then validate the digital signatures associated with the proposed revised program, and, if they carried the proper authority, would then commence using the new program in place of the program which had arrived as part of the standard traversal.

Attaching user files.

Exporting attached files into user files.

Detaching previously attached files.
Accessing a digital notary device
Performing a program traversal
Transmitting user data (in other than a traversal), so that the transmission does not include the travelling program itself, (e.g., simply sending a message to another destination.
Using built-in functions to simplify the use, creation, display, construction and receipt of EDI (such as X12 or EDIFACT) to conveniently supply common information and facilities without having to supply these functions in the travelling program. This includes built-in functions which access the Data Element Dictionary, the Segment Dictionary, the segment rules, and the transaction sets themselves.

While the invention has been described in connection with what is presently considered to be the most practical embodiment, it is to be understood that the invention is not to be limited to the disclosed embodiment, but on the contrary, is intended to cover various modifications and equivalent arrangements included within the spirit and scope of the appended claims.

What is claimed is:

1. In a communications system having a plurality of digital computers coupled to a channel over which computers exchange digital messages, a method for processing information among said computers comprising the steps of:
    executing on a digital computer a first travelling program comprising a sequence of digital instructions which determines at least one next destination that receives the set of instructions, said set of instructions including instructions for transmitting said instructions together with accompanying digital data to said next destination;
    transmitting to at least one of said digital computers a second travelling program; and
    executing the second travelling program under direction of the first travelling program.

2. A method according to claim 1, wherein the first and second travelling programs include the same set of instructions but do not include the same set of program variables.

3. A method according to claim 1 wherein the first and second travelling programs comprise distinct sets of instructions.

4. A method according to claim 1, further including the step of presenting data by the first travelling program to the second travelling program which defines the operation to be performed by the second travelling program.

5. A method according to claim 1 wherein the second travelling program returns data to the first travelling program.

6. A method according to claim 1, wherein both travelling programs are transmitted in an interpretative format, whereby the travelling programs and data can be interpreted on a variety of computer system and hardware architectures.

7. A method according to claim 6, whereby the interpretative format can be processed on at least two distinct types of computers.

8. A method according to claim 1, further including the step of erasing the second travelling program from memory by the first travelling program.

9. A method according to claim 1, further including the step of preserving the second travelling program after its execution.

10. In a communications system having a plurality of digital computers coupled to a channel over which digital computers exchange messages, a method for processing information among said computers comprising the steps of:
    executing on a digital computer a first travelling program instance comprising a sequence of digital instructions, including instructions which determine at least one next destination that receives the set of instructions, said set of instructions including instructions for transmitting said instructions together with accompanying digital data to said next destination;
    transmitting to at least one of said digital computers a second travelling program instance; and
    processing the second travelling program under direction of instructions in the first travelling program instance.

11. A method according to claim 10 wherein the processing operation includes the step of erasing the second travelling program instance.

12. A method according to claim 10, wherein the processing step includes the step of extracting data from the second travelling program instance.

13. A method according to claim 10, wherein the processing step includes the step of altering the program instructions in the second travelling program instance.

14. A method according to claim 10 wherein the processing operation includes the step of altering the value of the variables stored in the second travelling program instance.

15. A method according to claim 10 wherein said second program instance includes the same instructions as the first program instance.

16. In a communications system having a plurality of digital computers coupled to a channel over which digital computers exchange messages, a method for processing digital information among said computers comprising the steps of:
    executing on a first computer with a sequence of digital instructions, including instructions which determine at least one next destination that should receive the set of instructions, said set of instructions including instructions for transmitting said instructions together with accompanying digital data to said next destination;
    selecting a file in response to execution of said sequence of instructions; and
    transmitting at least part of the content of said selected file to said next destination in response to execution of said sequence of instructions.

17. A method according to claim 16, including the step of digitally signing at least part of the data of said file.

18. A method according to claim 16, including the step of computing a hash value of at least part of the data of said file.

19. In a communications system having a plurality digital of computers coupled to a channel over which digital computers exchange messages, a method for forwarding information in said communications system comprising the steps of:
    executing on a first digital computer a set of instructions including digital instructions which generate a plurality of instances of said set of instructions and which initiate transmission to at least a first and a second destination which respectively receive one of said instances together with accompanying digital data;

including within said instances transmitted to said first and second destinations digital instructions for subsequently merging, at a merging destination, data that has been accumulated during their distinct transmission paths via said first and second destinations; and transmitting one of said instances to said first destination and one of said instances to said second destination.

20. A method according to claim 19, further including the steps of:

establishing one instance as the master instance; and controlling the master to extract data from other instances as they arrive at the merging destination.

21. In a communications system having a plurality of digital computers coupled to a channel over which digital computers exchange messages, a method for processing digital information among said computers comprising the steps of:

executing on a first computer with a sequence of digital program instructions, including instructions which determine at least one next destination that receive the set of instructions, said set of instructions including instructions for transmitting said instructions together with accompanying digital data to said next destination;

qualifying the set of operations which said sequence of instructions is allowed to perform;

transmitting said set of instructions to said next destination; and determining at said next destination whether an operation to be performed under the control of said set of instructions is authorized.

22. A method according to claim 21, wherein said step of qualifying the set of operations is specified by a party using said program.

23. A method according to claim 21, further including the step of digitally signing information indicative of qualified operations by a party trusted by the parties using said travelling program.

24. In a communications system having a plurality of digital computers coupled to a channel over which digital computers exchange messages, a method for processing digital information among said computers comprising the steps of:

executing on a first digital computer a sequence of program instructions, including digital instructions which determine at least one next destination that receives the set of instructions, said set of instructions including instructions for transmitting said instructions together with accompanying digital data to said next destination;

transmitting said sequence of instructions to at least one next destination; and performing a date/time notarization of information controlled by said sequence of instructions.

25. In a communications system having a plurality of digital computers coupled to a channel over which digital computers exchange messages, a method for processing digital information among said computers comprising the steps of:

executing on a first computer with a sequence of digital program instructions, including digital instructions which determine at least one next destination that receives the set of instructions, said set of instructions including instructions for transmitting said instructions together with accompanying digital data to said next destination;

transmitting said sequence of digital instructions to at least one next destination; and performing a time delay operation under the control of said sequence of instructions.

26. In a communications system having a plurality of digital computers coupled to a channel over which digital computers exchange messages, a method for processing digital information among said computers comprising the steps of:

executing on a first digital computer a sequence of digital instructions, including digital instructions which determine at least one next destination that receives the sequence of digital instructions;

acquiring digital data from a user of at least one of said computers under the control of said sequence of digital instructions;

translating said data under the control of said sequence of digital instructions into a predefined data structure;

digitally signing at least part of said data structure via the execution of said sequence of digital instructions to create a digital signature value; and transmitting digital information including said digital signature value to a next destination under the control of said sequence of digital instructions.

27. A method according to claim 26, wherein said translating step includes the step of translating said data under control of said sequence of instructions into an Electronic Data Interchange (EDI) format.

28. A method according to claim 26, wherein at least part of the aggregate of said data structure together with the digital signature of said data structure is transmitted as a set of data independently of the sequence of digital instructions.

29. A method according to claim 26, wherein the result of the digital signature is verified when the set of instructions is executed at at least one subsequent destination.

* * * * *